(12) United States Patent
Bickham

(10) Patent No.: US 7,336,877 B2
(45) Date of Patent: Feb. 26, 2008

(54) BROADBAND OPTICAL FIBER

(75) Inventor: Scott R. Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 139 days.

(21) Appl. No.: 11/157,304

(22) Filed: Jun. 20, 2005

(65) Prior Publication Data

US 2006/0045450 A1 Mar. 2, 2006

Related U.S. Application Data

(60) Provisional application No. 60/605,744, filed on Aug. 31, 2004.

(51) Int. Cl.
*G02B 6/036* (2006.01)

(52) U.S. Cl. ..................................... 385/127

(58) Field of Classification Search ......... 385/123–128
See application file for complete search history.

(56) References Cited

U.S. PATENT DOCUMENTS

| | | | | |
|---|---|---|---|---|
| 4,204,745 A | 5/1980 | Sakai et al. | ............... | 350/96.31 |
| 4,372,647 A | 2/1983 | Okamoto et al. | ......... | 350/96.33 |
| 4,439,007 A | 3/1984 | Lazay et al. | ............... | 350/96.3 |
| 4,877,304 A * | 10/1989 | Bhagavatula | ................ | 385/124 |
| 5,175,785 A | 12/1992 | Dabby | ......................... | 385/123 |
| 5,673,342 A | 9/1997 | Nelson et al. | ................. | 385/24 |
| 5,675,690 A | 10/1997 | Nouchi et al. | ............... | 385/127 |
| 5,878,182 A | 3/1999 | Peckham | ..................... | 385/123 |
| 5,999,679 A | 12/1999 | Antos et al. | ................. | 385/127 |
| 6,456,770 B1 | 9/2002 | Sansonetti et al. | ........... | 385/123 |
| 6,600,862 B2 | 7/2003 | Mukasa | ....................... | 385/124 |
| 6,795,628 B2 | 9/2004 | Shibuta | ....................... | 385/123 |
| 6,798,962 B2 | 9/2004 | Berkey et al. | .............. | 385/124 |
| 6,801,699 B1 | 10/2004 | Bickham et al. | ............ | 385/123 |
| 2002/0097970 A1 | 7/2002 | Sasaoka | ....................... | 385/123 |
| 2003/0026566 A1 | 2/2003 | Diep et al. | ................... | 385/123 |
| 2004/0033039 A1 | 2/2004 | Oliveti et al. | ................ | 385/123 |
| 2004/0067064 A1 | 4/2004 | McNicol et al. | ............ | 398/158 |
| 2004/0141703 A1 | 7/2004 | Oh et al. | ...................... | 385/123 |
| 2004/0141705 A1 | 7/2004 | Cho et al. | ................... | 385/127 |
| 2004/0264896 A1 | 12/2004 | Takahashi et al. | ........... | 385/103 |

FOREIGN PATENT DOCUMENTS

EP 0 260 795 7/1987

(Continued)

OTHER PUBLICATIONS

Reed et al., "*Tailoring Optical Characteristics of Dispersion-Shifted lightguides for Applications Near 1.55 μm*", AT&T Technical Journal, American Telephone and Telegraph Co., vol. 65, No. 5, Sep. 1, 1986, pp. 105-122.

(Continued)

*Primary Examiner*—Sarah Song
(74) *Attorney, Agent, or Firm*—Joseph M. Homa; Robert L. Carlson

(57) ABSTRACT

An optical waveguide fiber having a multi-segmented core surrounded by a cladding, the core having a central segment and an annular segment surrounding the central segment. The central segment has a positive relative refractive index profile, and the annular segment has a negative relative refractive index profile. The broadband optical fiber has a bandwidth of at least 2 GHz-km for one or more wavelengths between 775 and 1100 nm.

24 Claims, 7 Drawing Sheets

FOREIGN PATENT DOCUMENTS

| EP | 0 327 702 | 8/1989 |
|---|---|---|
| EP | 0 689 068 | 12/1995 |
| EP | 1 107 027 | 6/2001 |
| EP | 1 124 145 | 8/2001 |
| EP | 1 255 138 | 11/2002 |
| EP | 1 353 202 | 10/2003 |
| EP | 1 076 250 | 2/2004 |
| WO | WO00/36443 | 6/2000 |
| WO | WO00/52507 | 9/2000 |
| WO | WO 03/012501 | 2/2003 |
| WO | WO 2004/092794 | 10/2004 |

OTHER PUBLICATIONS

Kato et al., "*Low Nonlinearity Dispersion-Shifted Fibers Employing Dual-Shaped Core Profile with Depressed Cladding*", OFC, Optical Fiber Communication Conference Technical Digest Series, 1997, p. 66.

Namihira et al., "*Low Nonlinear Optical Fibers for WDM Transmission*", IEICE Technical Report, May 1999, pp. 61-66.

Kato et al., "*Dispersion Shifted Fiber for WDM Transmission*", IEICE Technical Report, Nov. 1996, pp. 43-48.

Bhagavatula et al., "*Segmented-Core Single-Mode Fibres with Low Loss and Low Dispersion*", Electronics Letters, Apr. 28, 1983, vol. 19 No. 9, pp. 317-318.

Miya et al., "*Fabrication of Low Dispersion Single-Mode Fibers Over a Wide Spectral Range*", IEEE Journal of Quantum Electronics, vol. QE-17 No. 6, Jun. 1981, pp. 858-861.

Safaai-Jazi et al., "*Evaluation of chromatic dispersion in W-type fibers*", Optics Letters, vol. 14, No. 14, Jul. 15, 1989, pp. 760-762.

Guan et al., "*Multimode Fibers for Compensating Intermodal Dispersion of Graded-Index Multimode Fibers*", Journal of Lightwave Technology, vol. 22, No. 7, Jul. 2004, pp. 1714-1719.

Kato et al., "*Ultra-low nonlinearity low-loss pure silica core fibre for long-haul WDM transmission*", Electronics Letters, Sep. 16, 1999, vol. 35, No. 19, p. 182.

Lazay et al., "*Developments in Single-Mode Fiber Design, materials, and Performance at Bell Laboratories*", IEEE Journal of Quantum Electronics, vol. QE-18, No. 4, Apr. 1982, pp. 504-510.

\* cited by examiner

BROADBAND OPTICAL FIBER

This application claims the benefit of priority under 35 U.S.C. § 119(e) of U.S. Provisional Application Ser. No. 60/605,744 filed on Aug. 31, 2004.

BACKGROUND OF THE INVENTION

1. Field of the Invention

The present invention is directed generally to optical fiber for telecommunications and more specifically to an optical fiber capable of multimode operation at wavelengths below about 1260 nm and single mode operation at wavelengths above about 1260 nm.

2. Technical Background

Multimode fiber suitable for operation at 850 nm has been the preferred fiber for wiring homes and small businesses because the various system components (e.g. lasers, receivers) used in conjunction with this fiber are inexpensive. However, conventional 850 nm multimode fiber has undesirably low bandwidth and can support a relatively low bit rate. Furthermore, conventional 850 nm multimode fiber is incompatible with higher bit rate components, such as 1300 nm single mode lasers and receivers. Thus, both components and fiber typically must be replaced to upgrade to a higher bit rate system.

Known experimental fibers capable of both multimode operation at 850 nm and single mode operation at 1300 nm have been reported in the literature, however, those fibers had step index profiles and tended to have very low bandwidth at 850 nm.

U.S. Patent Publication No. 2003/0161597 (" '597 Publication") discloses an optical fiber capable of multimode operation at 850 nm and single mode operation at 1300 nm. The embodiments disclosed in Table I the '597 Publication have bandwidths of 0.6 to 1.5 GHz.km and would only be capable of transmitting 10 Gb/s signals along distances of 60 to 150 m, lower than needed in most local area networks.

Intermodal noise is a problem typically associated with multimode fibers. Intermodal noise is related to a variation of the optical intensity at a given optical fiber output location due to optical interference between modes of different phase. Many factors may act singly or in combination to produce phase changes that can cause intermodal noise. Some factors include: changes in temperature; mechanical distortions (including movement or vibration); and, changes in optical source wavelength.

Intermodal noise is a common problem in multimode fibers when used with highly coherent light sources, e.g., lasers, because the relative coherence of the modes allows the modes to affect the intensity of the light by interfering with each other. Less coherent sources, such as LED's, have a short coherence length and therefore are only subject to intermodal noise in very short lengths of fiber. However, LED sources are polychromatic and cause significant pulse broadening in the fiber, and pulse broadening reduces bandwidth. Therefore, it would be advantageous to have a fiber designed for operation with coherent light sources which does not suffer from intermodal noise.

SUMMARY OF THE INVENTION

Optical waveguide fibers are disclosed herein having a multi-segmented core surrounded by a cladding, the core comprising a central segment extending radially outwardly from the centerline and an annular segment surrounding and directly adjacent the central segment. The central segment preferably has a positive relative refractive index profile, and the annular segment preferably has a negative relative refractive index profile. The optical fiber has a high bandwidth for one or more wavelengths between 775 nm and 1100 nm and in cabled form preferably is dual-moded between 775 nm and 1260 nm and single-moded between 1260 nm and 1700 nm.

$\Delta_{1MAX}$ is between 0.35 and 0.45%, preferably between 0.37 and 0.43%; $R_1$ is between 5.0 and 5.5 µm, preferably between 5.1 and 5.4 µm; $\alpha_1$ is between 1.8 and 4, preferably 2.0 and 3.5; $\Delta_{2MIN}$ is between −0.05 and −0.15%, preferably between −0.05 and −0.13%; $R_2$ is between 8 and 13 µm; $W_2$ is between 3 and 8 µm; and $R_{2MID}$ is between 7 and 10 µm. $R_{2HI}$ is between 5.0 and 5.0 µm, $R_{2HO}$ is between 8.5 and 12.5 µm, $HHPW_2$ is between 3 and 7 µm, and $R_{2HMID}$ is between 7 and 9 µm.

The optical fibers have: dispersion at 1550 nm between 16 and 20 ps/nm-km; dispersion slope at 1550 nm less than 0.06 ps/nm²-km; attenuation at 1550 nm less than 0.20 dB/km; attenuation at 1310 nm less than 0.4 dB/km, preferably less than 0.35 dB/km; LP11 attenuation at 850 nm less than 2.0 dB/km; LP02 attenuation at 850 nm less than 2.0 dB/km; effective area at 1550 nm greater than 60 µm²; MFD at 1550 nm greater than 9.0 µm; pin array at 1550 nm less than 10 dB; lateral load at 1550 nm less than 1 dB/m, preferably less than 0.5 dB/m; LP11 cutoff (theoretical) less than 1300 nm; LP11 cutoff (fiber) less than 1260 nm; LP02 cutoff (theoretical) less than 875 nm, preferably less than 850 nm, more preferably less than 825 nm; LP02 cutoff (fiber) less than 850 nm, preferably less than 825 nm, more preferably less than 800 nm; LP11 pin array at 850 nm less than 1 dB, preferably less than 0.5 dB; the absolute magnitude of the dispersion of 1310 nm less than 5 ps/nm-km; dispersion slope at 1310 nm less 0.1 ps/nm²-km, preferably less than 0.09 ps/nm²-km; lambda zero less than 1320 nm, preferably between 1280 and 1320 nm; MFD at 1310 nm less than 9.5 µm, preferably between 8.0 and 9.5 µm; effective area at 1310 nm less than 65 µm². Preferably the LP01 dispersion at 850 nm has an absolute magnitude of less than 100 ps/nm-km, and the LP11 dispersion at 850 nm has an absolute magnitude of less than 100 ps/nm-km. Preferably the optical fibers have at 980 nm: absolute magnitude of dispersion<55 ps/nm-km, LP01 MFD from 7.0 to 7.5 µm, LP11 MFD from 6.8 to 7.5 µm, and attenuation<1.1 dB/km. Preferably the optical fibers have: LP01 Attenuation at 980 nm<2 dB/km, more preferably <1.5 dB/km; LP11 Attenuation at 980 nm<2 dB/km, more preferably <1.5 dB/km; LP01 MFD at 980 nm>6.8 µm; LP11 MFD at 980 nm>6.5 µm; LP01 MFD at 850 nm>6.0 µm; LP11 MFD at 850 nm>6.0 µm; absolute magnitude of LP01 Dispersion at 980 nm<70 ps/nm-km, more preferably <50 ps/nm-km; absolute magnitude of LP11 Dispersion at 980 nm<70 ps/nm-km, more preferably <60 ps/nm-km.

In preferred embodiments, the optical fiber disclosed herein has an attenuation at 1380 nm not more than 0.1 dB/km greater than an attenuation at 1310 nm. Preferably, the attenuation at 1380 nm is less than the attenuation at 1310 nm.

Preferably the optical fiber described and disclosed herein allows suitable performance at a plurality of operating wavelength windows between about 800 nm and about 1650 nm. More preferably, the optical fiber described and disclosed herein allows suitable single mode performance at a plurality of wavelengths from about 1260 nm to about 1650 nm and dual mode performance at a plurality of wavelengths from about 800 nm to about 1100 nm. In a preferred embodiment, the optical fiber described and disclosed herein is a triple window fiber which can accommodate operation in at least the 850 nm window, the 1310 nm window, and the 1550 nm window. In another preferred embodiment, the optical fiber described and disclosed herein is a multiple window fiber which can accommodate operation in at least the 850 nm window, the 980 nm window, the 1310 nm window, and the 1550 nm window.

Reference will now be made in detail to the present preferred embodiments of the invention, examples of which are illustrated in the accompanying drawings.

DETAILED DESCRIPTION OF THE PREFERRED EMBODIMENT

Figure 1:
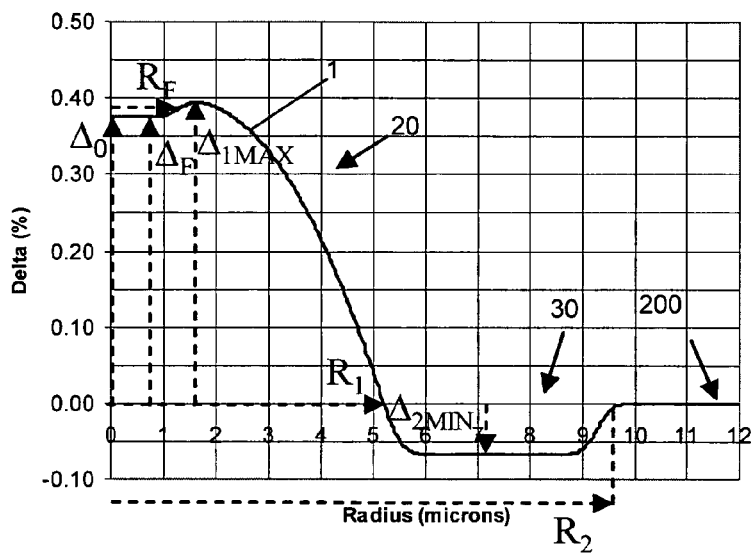
FIGS. 1-3 show refractive index profiles corresponding to a first set of preferred embodiments of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion values in a two-moded regime assume intermodal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi(\int f^2 r \, dr)^2/(\int f^4 r \, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha)$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2w=MFD, and $w^2 = (2\int f^2 r \, dr / \int [df/dr]^2 r \, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement (when using the multimode reference technique), i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Bandwidth can be measured by using the TIA/EIA Standard described in TIA/EIA-455-204 "Measurement of Bandwidth on Multimode Fiber", or "FOTP-204", or by using the TIA/EIA Standard described in TIA/EIA-455-220 "Differential Mode Delay Measurement of Multimode Fiber in the Time Domain", or "FOTP-220", as appropriate.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "850 nm band" is 800 to 900 nm; "980 nm band" is 900-1100 nm; "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and a cladding layer (or cladding) surrounding and directly adjacent the core. The cladding has a relative refractive index profile, $\Delta_c(r)=0$ throughout the cladding and extending until the outermost radius of the silica-based part of the optical fiber. The core comprises a refractive index profile, $\Delta_{CORE}(r)$. The core is comprised of a plurality of core segments, each having respective refractive index profiles.

Preferably, the central segment comprises silica doped with germanium, i.e. germania doped silica. Dopants other than germanium, singly or in combination, may be employed within the core, and particularly at or near the centerline, of the optical fiber disclosed herein to obtain the desired refractive index and density.

Preferably, the refractive index profile of the optical fiber disclosed herein is positive from the centerline to the outer radius of the central segment. In preferred embodiments, the optical fiber contains no index-decreasing dopants in the central segment.

Optical waveguide fibers 100 are disclosed herein which preferably comprise: a central segment 20 extending radially outwardly from the centerline to a central segment outer radius, $R_1$, and having a relative refractive index profile, $\Delta_1(r)$ in %, with a maximum relative refractive index percent, $\Delta_{1MAX}$; an annular segment 30 surrounding the central segment 20 and directly adjacent thereto, extending radially outwardly to an annular segment outer radius, $R_2$, having a width $W_2$ disposed at a midpoint $R_{2MID}$, and having a relative refractive index profile, $\Delta_2(r)$ in %, with a minimum relative refractive index percent, $\Delta_{2MIN}$, wherein $\Delta_{1MAX}>0>\Delta_{2MIN}$; and an outer annular cladding 200 surrounding the annular segment 30 and preferably directly adjacent thereto and having a relative refractive index percent, $\Delta_{CLAD}(r)$ in %. The relative refractive index at the centerline is $\Delta_0$. $R_1$ is defined to occur at the intersection of the relative refractive index of the central segment with the horizontal $\Delta(r)=0\%$ axis. $R_2$ represents the intersection of the relative refractive index of the annular segment with the horizontal $\Delta(r)=0\%$ axis, and is defined here to occur at the radius where $|\Delta_2(r)|<0.02\%$, wherein that radius is greater than the radius at which $\Delta_{2MIN}$ occurs. The annular segment 30 begins at $R_1$ and ends at $R_2$. The width $W_2$ of the annular segment is $R_2-R_1$ and its midpoint $R_{2MID}$ is $(R_1+R_2)/2$. The inner half peak height ($\Delta_{2MIN}/2$) of the annular segment occurs at a radius $R_{2HHI}$. The outer half peak height ($\Delta_{2MIN}/2$) of the annular segment occurs at a radius $R_{2HHO}$. The half-height peak width of the annular segment, HHPW2, is $R_{2HH0}-R_{2HHI}$, and the midpoint of the half-height peak width of the annular segment, $R_{2HHMID}$, is $(R_{2HHI}+R_{2HH0})/2$. Preferably, $\Delta_1(r)$ is positive for all radii from 0 to $R_1$. Preferably, $\Delta_{CLAD}(r)<0.02\%$, more preferably $\Delta_{CLAD}(r)=0$, for all radii from $R_2$ to the outermost radius of the cladding 200, i.e. the outermost diameter of the silica-based part of the optical fiber (excluding any coating). The core ends and the cladding begins at a radius $R_{CORE}$, and $R_{CORE}=R_2$.

In some embodiments, the central segment of the core comprises a relative refractive index profile having a so-called centerline dip wherein the central segment has a local minimum in the refractive index profile at radii less than $R_{MAX}$, the radius at which $\Delta_{MAX}$ occurs.

1st Set of Preferred Embodiments

Figure 2:
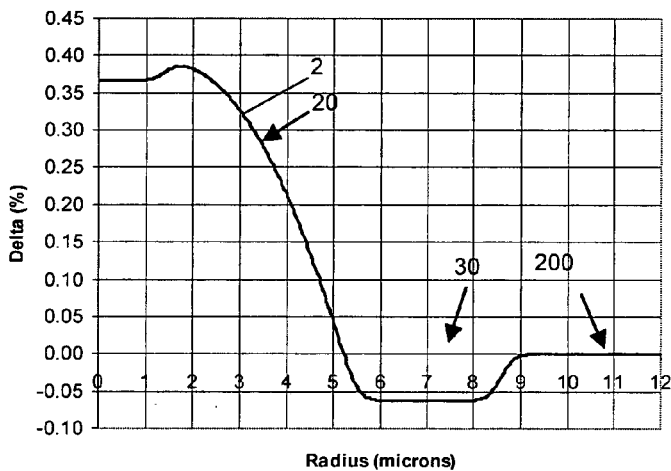
Figure 3:
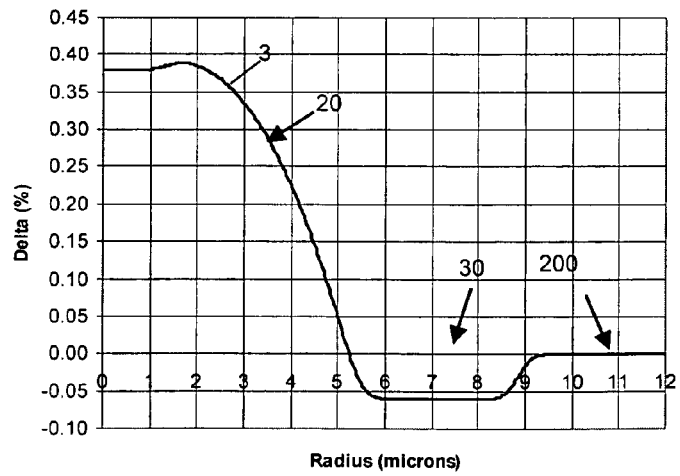
Figure 4:
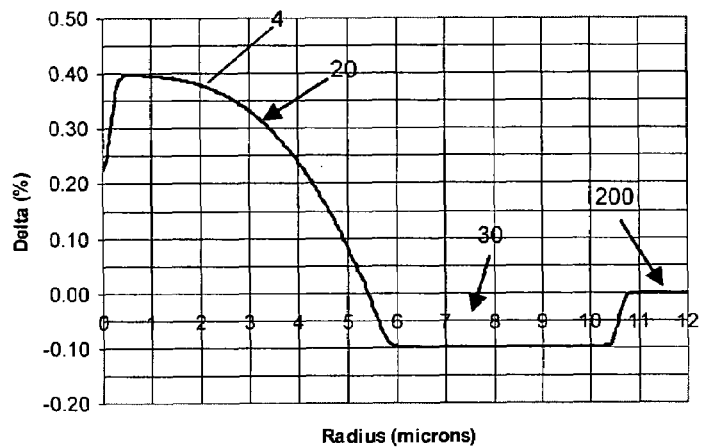
FIGS. 4-8 show refractive index profiles corresponding to a second set of preferred embodiments of an optical waveguide fiber as disclosed herein.
Figure 5:
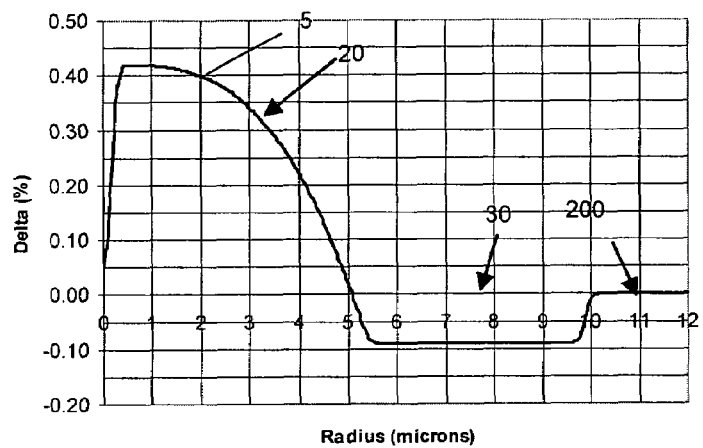
Figure 6:
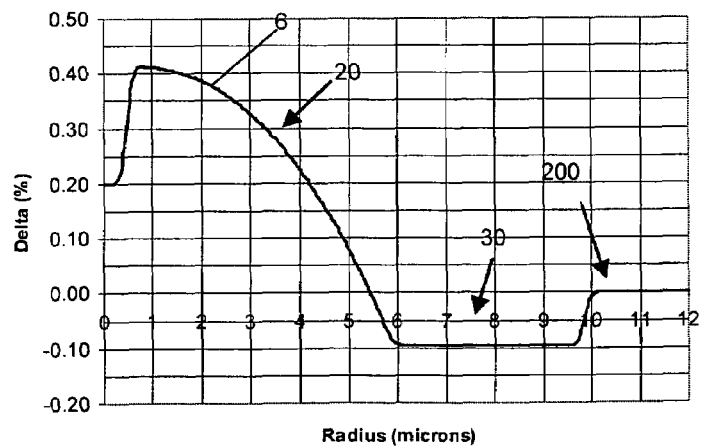
Figure 7:
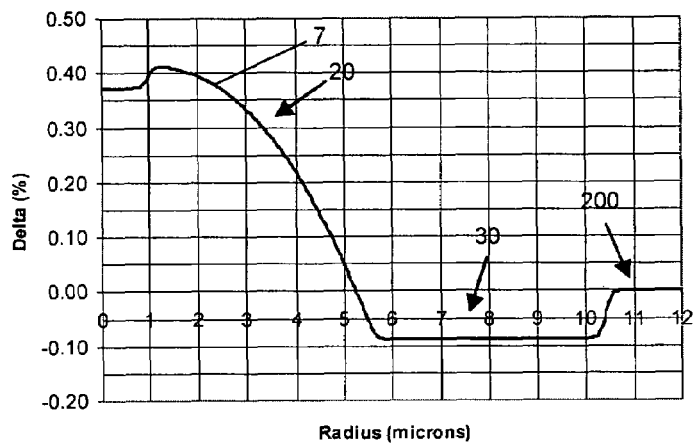
Figure 8:
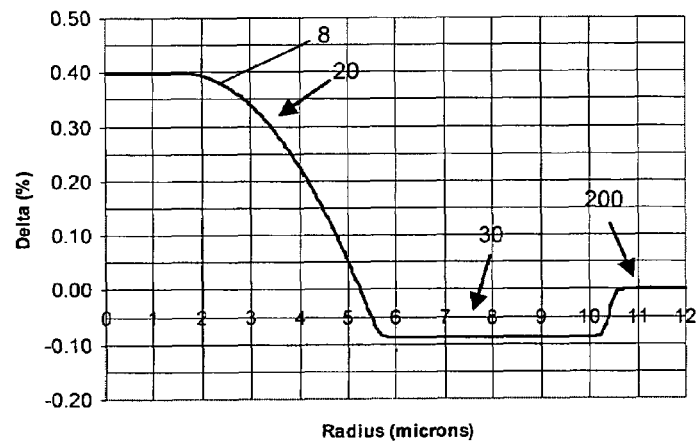
Figure 12:
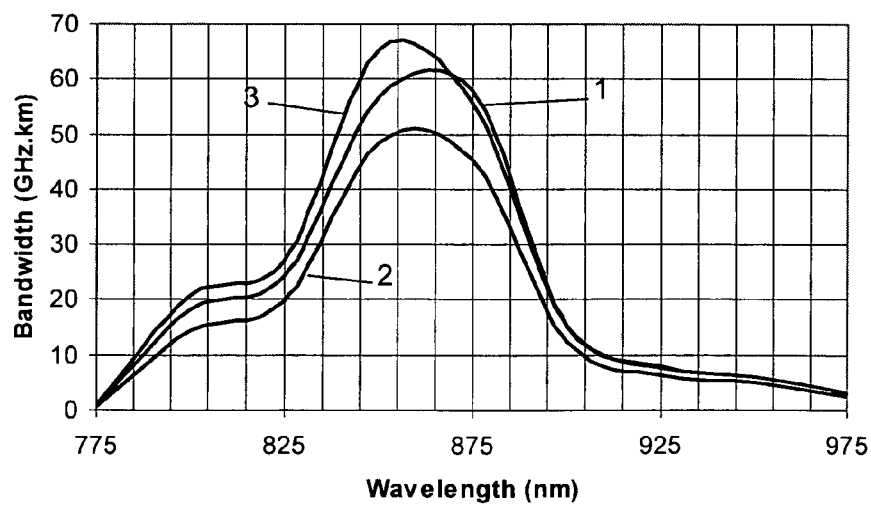
FIG. 12 shows bandwidth versus wavelength for the optical fiber profiles of FIGS. 1-3.

Tables 1-2 list characteristics of Examples 1-3 of an illustrative first set of preferred embodiments. FIGS. 1-3 show the refractive index profiles corresponding to Examples 1-3, labeled as curves 1-3, respectively, and FIG. 12 shows the respective fiber bandwidth versus wavelength, labeled 1-3.

TABLE 1

|  |  | Example | | |
|---|---|---|---|---|
|  |  | 1 | 2 | 3 |
| $\Delta_0$ | % | 0.37 | 0.37 | 0.38 |
| $\Delta_F$ | % | 0.37 | 0.37 | 0.38 |
| $R_F$ | µm | 1.3 | 1.4 | 1.4 |
| $\Delta_{1MAX}$ | % | 0.39 | 0.39 | 0.39 |
| $R_1$ | µm | 5.2 | 5.2 | 5.25 |
| $\alpha_1$ |  | 2.9 | 3.0 | 2.3 |
| $\Delta_{2\ MIN}$ | % | −0.07 | −0.06 | −0.06 |
| $R_2$ | µm | 9.5 | 8.8 | 9.0 |
| $W_2$ | µm | 4.3 | 3.6 | 3.8 |
| $R_{2MID}$ | µm | 7.4 | 7.0 | 7.1 |
| $R_{2HI}$ | µm | 5.4 | 5.4 | 5.4 |
| $R_{2HO}$ | µm | 9.3 | 8.6 | 8.8 |
| HHPW2 | µm | 3.9 | 3.2 | 3.4 |
| $R_{2HMID}$ | µm | 7.4 | 7.0 | 7.1 |

TABLE 2

|  |  | Example | | |
|---|---|---|---|---|
|  |  | 1 | 2 | 3 |
| Dispersion @ 1550 nm | ps/nm-km | 17.2 | 16.9 | 17.2 |
| Slope @ 1550 nm | ps/nm$^2$-km | 0.057 | 0.056 | 0.057 |
| Attenuation @ 1550 nm | dB/km | 0.191 | 0.191 | 0.191 |
| Attenuation @ 1310 nm | dB/km | 0.338 | 0.337 | 0.337 |
| LP01 Attenuation @ 850 nm | dB/km | 1.836 | 1.836 | 1.835 |
| LP11 Attenuation @ 850 nm | dB/km | 1.893 | 1.892 | 1.892 |
| Aeff @ 1550 nm | µm$^2$ | 71.87 | 73.81 | 73.16 |
| MFD @ 1550 nm | µm | 9.70 | 9.84 | 9.78 |
| Pin Array @ 1550 nm | dB | 6.98 | 8.50 | 6.04 |
| Lateral Load @ 1550 nm | dB/m | 0.28 | 0.35 | 0.27 |
| LP11 Cutoff (theoretical) | nm | 1231 | 1235 | 1258 |
| LP11 Cutoff (fiber) | nm | 1181 | 1185 | 1208 |
| LP02 Cutoff (theoretical) | nm | 779 | 779 | 796 |
| LP02 Cutoff (fiber) | nm | 754 | 754 | 771 |
| LP11 Pin array @ 850 nm | dB | 0.29 | 0.20 | 0.26 |
| Dispersion @ 1310 nm | ps/nm-km | 0.5 | 0.3 | 0.5 |
| Slope @ 1310 nm | ps/nm$^2$-km | 0.087 | 0.087 | 0.087 |
| Lambda Zero | nm | 1304 | 1306 | 1304 |
| MFD @ 1310 nm | µm | 8.62 | 8.72 | 8.70 |
| Aeff @ 1310 nm | µm$^2$ | 58.1 | 59.4 | 59.1 |
| LP01 Dispersion @ 850 nm | ps/nm-km | −87.5 | −87.4 | −87.5 |
| LP11 Dispersion @ 850 nm | ps/nm-km | −91 | −92 | −91 |
| |LP11 Disp./LP01 Disp.| @ 850 | — | 1.04 | 1.05 | 1.04 |
| LP01 Attenuation @ 980 nm | dB/km | 1.05 | 1.05 | 1.05 |
| LP11 Attenuation @ 980 nm | dB/km | 1.1 | 1.1 | 1.1 |
| LP01 MFD @ 980 nm | µm | 7.35 | 7.41 | 7.41 |
| LP11 MFD @ 980 nm | µm | 7.32 | 7.41 | 7.37 |
| LP01 MFD @ 850 nm | µm | 6.89 | 6.94 | 6.94 |
| LP11 MFD @ 850 nm | µm | 6.56 | 6.62 | 6.61 |
| LP01 Dispersion @ 980 nm | ps/nm-km | −46.8 | −46.8 | −46.8 |
| LP11 Dispersion @ 980 nm | ps/nm-km | −53.4 | −54.2 | −53.4 |
| |LP11 Disp./LP01 Disp.| @ 980 | — | 1.14 | 1.16 | 1.14 |
| Bandwidth (fiber) @ 775 nm | GHz-km | 0.8 | 0.6 | 0.8 |
| Bandwidth (fiber) @ 800 nm | GHz-km | 18.3 | 14.4 | 20.6 |
| Bandwidth (fiber) @ 825 nm | GHz-km | 24.4 | 19.8 | 27.1 |
| Bandwidth (fiber) @ 850 nm | GHz-km | 56.8 | 48.5 | 65.4 |
| Bandwidth (fiber) @ 875 nm | GHz-km | 57.9 | 45.3 | 55.6 |
| Bandwidth (fiber) @ 900 nm | GHz-km | 15.3 | 12.6 | 15.5 |
| Bandwidth (fiber) @ 925 nm | GHz-km | 7.8 | 6.5 | 7.9 |
| Bandwidth (fiber) @ 950 nm | GHz-km | 6.2 | 5.0 | 6.2 |
| Bandwidth (fiber) @ 975 nm | GHz-km | 3.2 | 2.7 | 3.2 |

The optical waveguide fiber in the first set of embodiments, such as Examples 1-3, comprises a central segment 20 and an annular segment 30. The central segment comprises an alpha portion with an $\alpha_1$ between 2 and 3.3. Preferably $\Delta_1(r)$ for the central segment comprises a centermost portion with a substantially constant relative refractive index, $\Delta_F$, and the alpha portion surrounds and is directly adjacent the centermost portion, and the alpha portion has an $\alpha$-profile, preferably with an $\alpha_1$ between 2 and 3.3. In some embodiments, such as Examples 1-3, $\Delta_1(r)$ for the central segment comprises a centermost portion which is lower than $\Delta_{1MAX}$, preferably greater than 0.7 $\Delta_{1MAX}$.

For the first set of preferred embodiments, $\Delta_0$ is between 0.35 and 0.40%, preferably between 0.36 and 0.39%, and even more preferably between 0.37 and 0.38%. $\Delta_F$ is between 0.35 and 0.40%, preferably between 0.36 and 0.39%, and more preferably between 0.37 and 0.38%. $R_F$ is between 1.2 and 1.5 μm, preferably between 1.3 and 1.4 μm. $\Delta_{1MAX}$ is between 0.35 and 0.45%, preferably between 0.35 and 0.40%; $R_1$ is between 5.0 and 5.4 μm, preferably between 5.1 and 5.3 μm; $\alpha_1$ is between 2 and 3.3, preferably between 2 and 3; $\Delta_{2\,MIN}$ is between −0.05 and −0.08%, preferably between −0.06 and −0.07%; $R_2$ is between 8 and 11 μm, preferably between 8.5 and 10 μm; $W_2$ is between 3 and 5 μm, preferably 3.5 and 4.5 μm; and $R_{2MID}$ is between 7 and 8 μm, preferably 7 and 7.5 μm. $R_{2HI}$ is between 5.2 and 5.6 μm, $R_{2HO}$ is between 8.5 and 9.5 μm, $HHPW_2$ is between 3 and 4 μm, and $R_{2HMID}$ is between 7 and 8 μm, preferably between 7 and 7.5 μm.

The first set of preferred embodiments have: dispersion at 1550 nm between 16 and 20 ps/nm-km, preferably 16 to 19 ps/nm-km; dispersion slope at 1550 nm less than 0.06 ps/nm²-km; attenuation at 1550 nm less than 0.20 dB/km; attenuation at 1310 nm less than 0.4 dB/km, preferably less than 0.35 dB/km; LP11 attenuation at 850 nm less than 2.0 dB/km; LP02 attenuation at 850 nm less than 2.0 dB/km; effective area at 1550 nm greater than 60 μm², preferably greater than 70 μm², and in some embodiments between 70 and 80 μm²; MFD at 1550 nm greater than 9.0 μm, preferably greater than 9.5 μm; pin array at 1550 nm less than 10 dB; lateral load at 1550 nm less than 1 dB/m, preferably less than 0.5 dB/m; LP11 cutoff (theoretical) less than 1300 nm; LP11 cutoff (fiber) less than 1260 nm; LP02 cutoff (theoretical) less than 875 nm, preferably less than 850 nm, more preferably less than 825 nm; LP02 cutoff (fiber) less than 850 nm, preferably less than 825 nm, more preferably less than 800 nm; LP11 pin array at 850 nm less than 1 dB, preferably less than 0.5 dB; the absolute magnitude of the dispersion of 1310 nm less than 5 ps/nm-km, preferably less than 2 ps/nm-km; dispersion slope at 1310 nm less 0.1 ps/nm²-km, preferably less than 0.09 ps/nm²-km; lambda zero less than 1320 nm, preferably between 1280 and 1320 nm, and in some preferred embodiments between 1300 and 1320 nm; MFD at 1310 nm less than 9.5 μm, preferably between 8.5 and 9.5 μm; effective area at 1310 nm less than 65 μm². Preferably the LP01 dispersion at 850 nm has an absolute magnitude of less than 100 ps/nm-km, and the LP11 dispersion at 850 nm has an absolute magnitude of less than 100 ps/nm-km. Preferably, LP01 Attenuation at 980 nm<2 dB/km, more preferably <1.5 dB/km. Preferably, LP11 Attenuation at 980 nm<2 dB/km, more preferably <1.5 dB/km. Preferably, LP01 MFD at 980 nm>7.0 μm, more preferably >7.25 μm. Preferably, LP11 MFD at 980 nm>7.0 μm, more preferably >7.25 μm. Preferably, LP01 MFD at 850 nm>6.5 μm, more preferably >6.7 μm. Preferably, LP11 MFD at 850 nm>6.0 μm, more preferably >6.5 μm. Preferably, the absolute magnitude of LP01 Dispersion at 980 nm<70 ps/nm-km, more preferably <50 ps/nm-km. Preferably, the absolute magnitude of LP11 Dispersion at 980 nm<70 ps/nm-km, more preferably <60 ps/nm-km. The absolute magnitude of dispersion of the LP11 mode at 850 nm is within 20%, preferably within 10%, even more preferably within 5%, of the absolute magnitude of the dispersion of the LP01 mode at 850 nm. The absolute magnitude of dispersion of the LP11 mode at 980 nm is within 20% of the absolute magnitude of the dispersion of the LP01 mode at 980 nm.

Referring to FIG. 12 and Table 2, the fiber bandwidth of optical waveguide fiber in the first set of embodiments, such as Examples 1-3, is greater than 50 GHz-km at all wavelengths in a wavelength range having a rangewidth of at least 25 nm, wherein the wavelength range lies between 775 and 975 nm, and greater than 25 GHz-km at all wavelengths in a wavelength range having a rangewidth of at least 50 nm, wherein the wavelength range lies between 775 and 975 nm, and greater than 10 GHz-km at all wavelengths in a wavelength range having a rangewidth of at least 100 nm, wherein the wavelength range lies between 775 and 975 nm, and greater than 5 GHz-km at all wavelengths in a wavelength range having a rangewidth of at least 125 nm, wherein the wavelength range lies between 775 and 975 nm.

2$^{nd}$ Set of Preferred Embodiments

Figure 13:
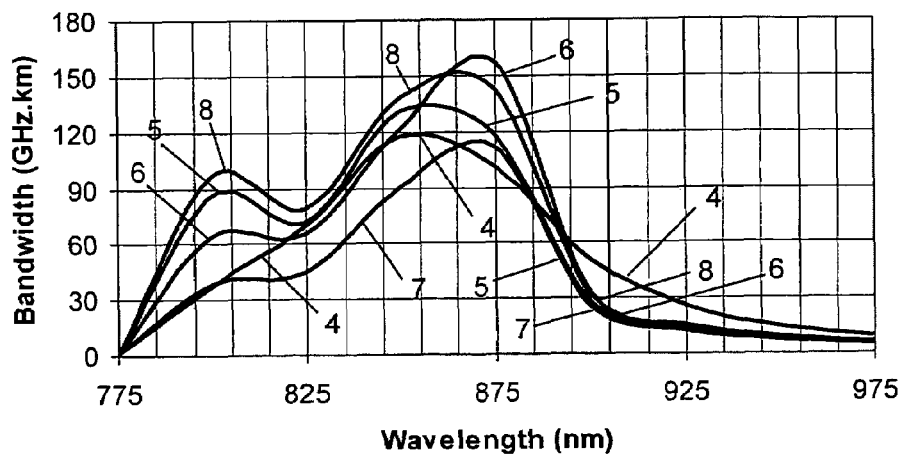
FIG. 13 shows bandwidth versus wavelength for the optical fiber profiles of FIGS. 4-8.

Tables 3-4 list characteristics of Examples 4-8 of an illustrative second set of preferred embodiments. FIGS. 4-8 show the refractive index profiles corresponding to Examples 4-8, labeled as curves 4-8, respectively, and FIG. 13 shows the respective fiber bandwidth versus wavelength, labeled 4-8.

TABLE 3

| | | Example | | | | |
|---|---|---|---|---|---|---|
| | | 4 | 5 | 6 | 7 | 8 |
| $\Delta_0$ | % | 0.23 | 0.06 | 0.20 | 0.37 | 0.40 |
| $\Delta_F$ | % | — | — | — | 0.37 | 0.40 |
| $R_F$ | μm | — | — | — | 0.8 | 1.9 |
| $\Delta_{1MAX}$ | % | 0.40 | 0.42 | 0.41 | 0.41 | 0.40 |
| $R_1$ | μm | 5.4 | 5.1 | 5.4 | 5.3 | 5.3 |
| $\alpha_1$ | | 2.9 | 3.0 | 2.3 | 2.2 | 2.0 |
| $\Delta_{2\,MIN}$ | % | −0.10 | −0.09 | −0.10 | −0.09 | −0.09 |
| $R_2$ | μm | 10.7 | 10.0 | 10.0 | 10.5 | 10.5 |
| $W_2$ | μm | 5.3 | 4.9 | 4.6 | 5.2 | 5.2 |
| $R_{2MID}$ | μm | 8.1 | 7.6 | 7.7 | 7.9 | 7.9 |
| $R_{2HI}$ | μm | 5.6 | 5.3 | 5.7 | 5.4 | 5.4 |
| $R_{2HO}$ | μm | 10.6 | 9.9 | 9.8 | 10.4 | 10.4 |
| HHPW2 | μm | 5.0 | 4.6 | 4.1 | 5.0 | 5.0 |
| $R_{2HMID}$ | μm | 8.1 | 7.6 | 7.8 | 7.9 | 7.9 |

TABLE 4

|  |  | Example | | | | |
| --- | --- | --- | --- | --- | --- | --- |
|  |  | 4 | 5 | 6 | 7 | 8 |
| Dispersion @ 1550 nm | ps/nm-km | 18.4 | 17.5 | 18.0 | 17.8 | 17.9 |
| Slope @ 1550 nm | ps/nm²-km | 0.058 | 0.057 | 0.058 | 0.057 | 0.058 |
| Attenuation @ 1550 nm | dB/km | 0.191 | 0.192 | 0.191 | 0.191 | 0.191 |
| Attenuation @ 1310 nm | dB/km | 0.337 | 0.338 | 0.338 | 0.338 | 0.337 |
| LP11 Attenuation @ 850 nm | dB/km | 1.834 | 1.838 | 1.839 | 1.836 | 1.835 |
| LP02 Attenuation @ 850 nm | dB/km | 1.888 | 1.896 | 1.890 | 1.893 | 1.893 |
| Aeff @ 1550 nm | μm² | 71.61 | 67.00 | 71.66 | 69.34 | 69.35 |
| MFD @ 1550 nm | μm | 9.64 | 9.34 | 9.65 | 9.50 | 9.50 |
| Pin Array @ 1550 nm | dB | 4.97 | 4.52 | 5.75 | 5.29 | 4.65 |
| Lateral Load @ 1550 nm | dB/m | 0.21 | 0.17 | 0.23 | 0.20 | 0.18 |
| LP11 Cutoff (theoretical) | nm | 1245 | 1219 | 1238 | 1224 | 1234 |
| LP11 Cutoff (fiber) | nm | 1195 | 1169 | 1188 | 1174 | 1184 |
| LP02 Cutoff (theoretical) | nm | 803 | 781 | 790 | 782 | 790 |
| LP02 Cutoff (fiber) | nm | 778 | 756 | 765 | 757 | 765 |
| LP11 Pin array @ 850 nm | dB | 0.1 | 0.1 | 0.3 | 0.2 | 0.2 |
| Dispersion @ 1310 nm | ps/nm-km | 1.3 | 0.8 | 1.1 | 0.9 | 1.0 |
| Slope @ 1310 nm | ps/nm²-km | 0.089 | 0.088 | 0.089 | 0.088 | 0.088 |
| Lambda Zero | nm | 1295 | 1301 | 1298 | 1300 | 1299 |
| MFD @ 1310 nm | μm | 8.66 | 8.35 | 8.65 | 8.50 | 8.51 |
| Aeff @ 1310 nm | μm² | 59.0 | 54.7 | 58.7 | 56.7 | 56.8 |
| LP01 Dispersion @ 850 nm | ps/nm-km | −87.6 | −87.7 | −87.8 | −87.7 | −87.6 |
| LP11 Dispersion @ 850 nm | ps/nm-km | −90 | −91 | −90 | −91 | −90 |
| |LP11 Disp./LP01 Disp.| @ 850 |  | 1.03 | 1.04 | 1.03 | 1.04 | 1.03 |
| LP01 Attenuation @ 980 nm | dB/km | 1.05 | 1.05 | 1.05 | 1.05 | 1.05 |
| LP11 Attenuation @ 980 nm | dB/km | 1.10 | 1.10 | 1.10 | 1.10 | 1.10 |
| LP01 MFD @ 980 nm | μm | 7.45 | 7.16 | 7.41 | 7.28 | 7.29 |
| LP11 MFD @ 980 nm | μm | 7.30 | 7.06 | 7.33 | 7.19 | 7.18 |
| LP01 MFD @ 850 nm | μm | 6.98 | 6.70 | 6.93 | 6.81 | 6.83 |
| LP11 MFD @ 850 nm | μm | 6.66 | 6.39 | 6.65 | 6.51 | 6.51 |
| LP01 Dispersion @ 980 nm | ps/nm-km | −46.6 | −46.8 | −46.8 | −46.8 | −46.8 |
| LP11 Dispersion @ 980 nm | ps/nm-km | −50.6 | −52.3 | −51.2 | −52.0 | −51.8 |
| |LP11 Disp./LP01 Disp.| @ 980 | — | 1.09 | 1.12 | 1.09 | 1.11 | 1.11 |
| Bandwidth (fiber) @ 775 nm | GHz-km | 0.7 | 1.1 | 1.1 | 1.0 | 1.2 |
| Bandwidth (fiber) @ 800 nm | GHz-km | 37.3 | 86.3 | 64.6 | 38.7 | 97.1 |
| Bandwidth (fiber) @ 825 nm | GHz-km | 69.3 | 71.9 | 66.0 | 44.8 | 79.1 |
| Bandwidth (fiber) @ 850 nm | GHz-km | 117.7 | 131.5 | 121.8 | 90.2 | 138.7 |
| Bandwidth (fiber) @ 875 nm | GHz-km | 101.4 | 117.8 | 156.7 | 111.0 | 142.3 |
| Bandwidth (fiber) @ 900 nm | GHz-km | 51.3 | 28.0 | 33.6 | 25.5 | 32.0 |
| Bandwidth (fiber) @ 925 nm | GHz-km | 26.0 | 13.2 | 15.8 | 12.4 | 15.0 |
| Bandwidth (fiber) @ 950 nm | GHz-km | 14.7 | 7.7 | 9.2 | 7.4 | 8.7 |
| Bandwidth (fiber) @ 975 nm | GHz-km | 9.1 | 4.9 | 5.9 | 4.9 | 5.6 |

The optical waveguide fiber in the second set of embodiments, such as Examples 4-8, comprises a central segment 20 and an annular segment 30. The central segment comprises an alpha portion with an $\alpha_1$ between 2 and 3.3. In some embodiments, such as Examples 7 and 8, $\Delta_1(r)$ for the central segment comprises a centermost portion with a substantially constant relative refractive index, $\Delta_F$, and the alpha portion surrounds and is directly adjacent the centermost portion, and the alpha portion has an α-profile, preferably with an $\alpha_1$ between 2 and 3.3. In other embodiments, such as Examples 4-6, $\Delta_1(r)$ for the central segment comprises a centermost portion which is substantially lower than $\Delta_{1MAX}$, preferably <0.8 $\Delta_{1MAX}$, which may be referred to as a pronounced centerline dip.

For the second set of preferred embodiments, $\Delta_0$ is between 0 and 0.45%. $\Delta_F$ is between 0.35 and 0.40%. $R_F$ is between 0.5 and 2.0 μm. $\Delta_{1MAX}$ is between 0.35 and 0.45%, preferably between 0.37 and 0.43%; $R_1$ is between 5.0 and 5.5 μm, preferably between 5.1 and 5.4 μm; $\alpha_1$ is between 2 and 3.3, preferably between 2 and 3; $\Delta_{2\,MIN}$ is between −0.08 and −0.13%, preferably between −0.09 and −0.11%, more preferably −0.09 and −0.10%; $R_2$ is between 9 and 12 μm, preferably between 10 and 11 μm; $W_2$ is between 4 and 6 μm, preferably 4.5 and 5.5 μm; and $R_{2MID}$ is between 7 and 8.5 μm, preferably 7.5 and 8.5 μm. $R_{2HI}$ is between 5.0 and 6.0 μm, $R_{2HO}$ is between 9 and 11 μm, $HHPW_2$ is between 4 and 5.5 μm, preferably 4 and 5 μm, and $R_{2HMID}$ is between 7 and 9 μm, preferably between 7.5 and 8.5 μm.

The second set of preferred embodiments have: dispersion at 1550 nm between 16 and 20 ps/nm-km, preferably 16 to 19 ps/nm-km; dispersion slope at 1550 nm less than 0.06 ps/nm²-km; attenuation at 1550 nm less than 0.20 dB/km; attenuation at 1310 nm less than 0.4 dB/km, preferably less than 0.35 dB/km; LP11 attenuation at 850 nm less than 2.0 dB/km; LP02 attenuation at 850 nm less than 2.0 dB/km; effective area at 1550 nm greater than 60 μm², preferably greater than 65 μm², and in some embodiments between 65 and 75 μm²; MFD at 1550 nm greater than 9.0 μm; pin array at 1550 nm less than 10 dB; lateral load at 1550 nm less than 1 dB/m, preferably less than 0.5 dB/m; LP11 cutoff (theoretical) less than 1300 nm; LP11 cutoff (fiber) less than 1260 nm; LP02 cutoff (theoretical) less than 875 nm, preferably less than 850 nm, more preferably less than 825 nm; LP02 cutoff (fiber) less than 850 nm, preferably less than 825 nm, more preferably less than 800 nm; LP11 pin array at 850 nm less than 1 dB, preferably less than 0.5 dB; the absolute magnitude of the dispersion of 1310 nm less than 5 ps/nm-km, preferably less than 2 ps/nm-km; dispersion slope at 1310 nm less 0.1 ps/nm 2-km, preferably less than 0.09 ps/nm²-km; lambda zero less than 1320 nm, preferably between 1280 and 1320 nm; MFD at 1310 nm less than 9.5 µm, preferably between 8 and 9 µm; effective area at 1310 nm less than 65 µm². Preferably the LP01 dispersion at 850 nm has an absolute magnitude of less than 100 ps/nm-km, and the LP11 dispersion at 850 nm has an absolute magnitude of less than 100 ps/nm-km. Preferably, LP01 Attenuation at 980 nm<2 dB/km, more preferably <1.5 dB/km. Preferably, LP11 Attenuation at 980 nm<2 dB/km, more preferably <1.5 dB/km. Preferably, LP01 MFD at 980 nm>6.8 µm, more preferably >7.0 µm. Preferably, LP11 MFD at 980 nm>6.8 µm, more preferably >7 µm. Preferably, LP01 MFD at 850 nm>6.5 µm, more preferably >6.7 µm. Preferably, LP11 MFD at 850 nm>6.0 µm, more preferably >6.3 µm. Preferably, the absolute magnitude of LP01 Dispersion at 980 nm<70 ps/nm-km, more preferably <50 ps/nm-km. Preferably, the absolute magnitude of LP11 Dispersion at 980 nm<70 ps/nm-km, more preferably <60 ps/nm-km. The absolute magnitude of dispersion of the LP11 mode at 850 nm is within 20%, preferably within 10%, even more preferably within 5%, of the absolute magnitude of the dispersion of the LP01 mode at 850 nm. The absolute magnitude of dispersion of the LP11 mode at 980 nm is within 20% of the absolute magnitude of the dispersion of the LP01 mode at 980 nm.

Referring to FIG. 13 and Table 4, the fiber bandwidth of optical waveguide fiber in the second set of embodiments, such as Examples 4-8, is greater than 100 GHz-km at all wavelengths in a wavelength range having a rangewidth of at least 25 nm, wherein the wavelength range lies between 775 and 975 nm, and greater than 90 GHz-km at all wavelengths in a wavelength range having a rangewidth of at least 50 nm, wherein the wavelength range lies between 775 and 975 nm, and greater than 50 GHz-km at all wavelengths in a wavelength range having a rangewidth of at least 100 nm, wherein the wavelength range lies between 775 and 975 nm, and greater than 5 GHz-km at all wavelengths in a wavelength range having a rangewidth of at least 150 nm, wherein the wavelength range lies between 775 and 975 nm.

3rd Set of Preferred Embodiments

Figure 9:
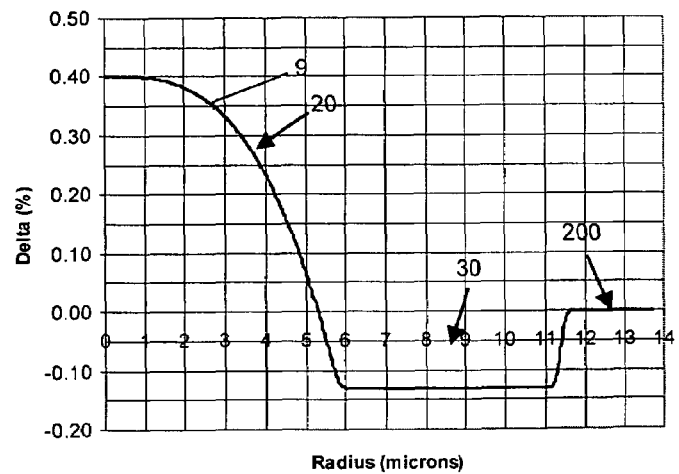
FIG. 9-11 show refractive index profiles corresponding to a third set of preferred embodiments of an optical waveguide fiber as disclosed herein.
Figure 10:
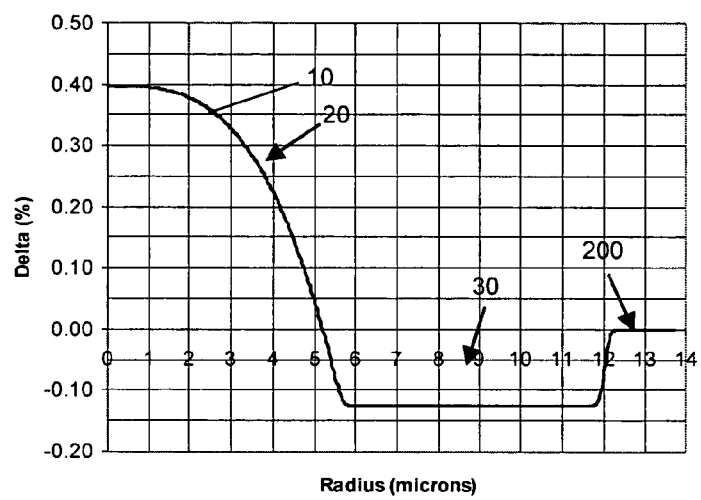
Figure 11:
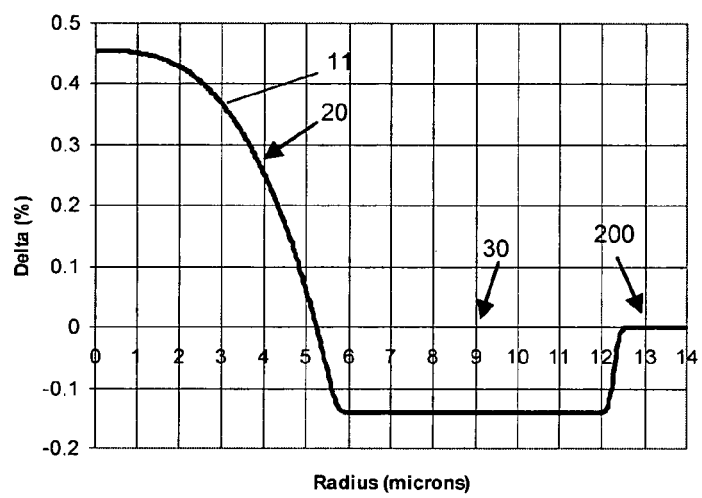
Figure 14:
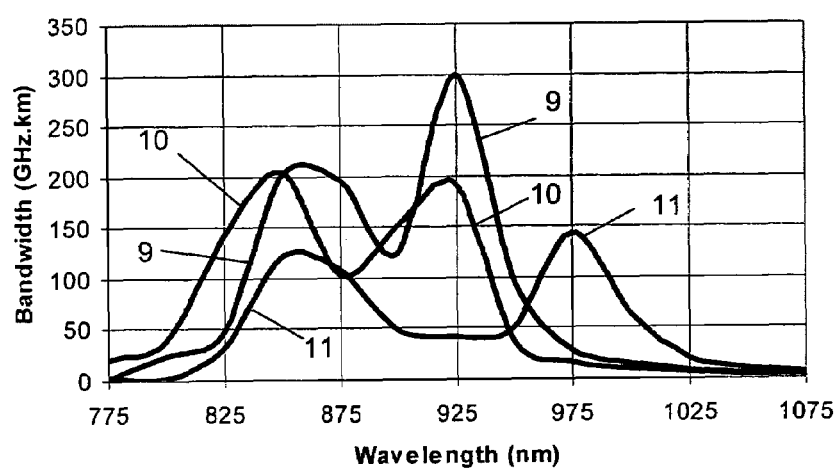
FIG. 14 shows bandwidth versus wavelength for the optical fiber profiles of FIGS. 9-11.

Tables 5-6 list characteristics of Examples 9-11 of an illustrative third set of preferred embodiments. FIGS. 9-11 show the refractive index profiles corresponding to Examples 9-11, labeled as curves 9-11, respectively, and FIG. 14 shows the respective fiber bandwidth versus wavelength, labeled 9-11.

TABLE 5

| | | Example | | |
|---|---|---|---|---|
| | | 9 | 10 | 11 |
| $\Delta_0$ | % | 0.40 | 0.40 | 0.45 |
| $\Delta_F$ | % | 0.40 | 0.40 | 0.45 |
| $R_F$ | µm | 1.4 | 1.0 | 1.45 |
| $\Delta_{1MAX}$ | % | 0.40 | 0.40 | 0.45 |
| $R_1$ | µm | 5.3 | 5.2 | 5.25 |
| $\alpha_1$ | | 3.1 | 3.2 | 3.0 |
| $\Delta_{2\ MIN}$ | % | −0.13 | −0.13 | −0.14 |
| $R_2$ | µm | 11.5 | 12.2 | 12.4 |
| $W_2$ | µm | 6.2 | 7.0 | 7.2 |
| $R_{2MID}$ | µm | 8.4 | 8.7 | 8.8 |
| $R_{2HI}$ | µm | 5.6 | 5.4 | 5.5 |
| $R_{2HO}$ | µm | 11.4 | 12.0 | 12.3 |
| HHPW2 | µm | 5.8 | 6.6 | 6.8 |
| $R_{2HMID}$ | µm | 8.5 | 8.7 | 8.9 |

TABLE 6

| | | Example | | |
|---|---|---|---|---|
| | | 9 | 10 | 11 |
| Dispersion @ 1550 nm | ps/nm-km | 18.8 | 18.6 | 19.0 |
| Slope @ 1550 nm | ps/nm²-km | 0.059 | 0.059 | 0.059 |
| Attenuation @ 1550 nm | dB/km | 0.191 | 0.191 | 0.192 |
| Attenuation @ 1310 nm | dB/km | 0.337 | 0.337 | 0.338 |
| LP01 Attenuation @ 850 nm | dB/km | 1.833 | 1.834 | 1.835 |
| LP11 Attenuation @ 850 nm | dB/km | 1.890 | 1.892 | 1.896 |
| Aeff @ 1550 nm | µm² | 68.53 | 67.90 | 63.15 |
| MFD @ 1550 nm | µm | 9.41 | 9.37 | 9.01 |
| Pin Array @ 1550 nm | dB | 5 | 6.5 | 1 |
| Lateral Load @ 1550 nm | dB/m | 0.18 | 0.22 | 0.04 |
| LP11 Cutoff (theoretical) | nm | 1216 | 1192 | 1269 |
| LP11 Cutoff (fiber) | nm | 1166 | 1142 | 1219 |
| LP02 Cutoff (theoretical) | nm | 792 | 775 | 826 |
| LP02 Cutoff (fiber) | nm | 767 | 750 | 801 |
| LP11 Pin array @ 850 nm | dB | 0.3 | 0.1 | 0.1 |
| Dispersion @ 1310 nm | ps/nm-km | 1.6 | 1.5 | 1.6 |
| Slope @ 1310 nm | ps/nm²-km | 0.090 | 0.089 | 0.090 |
| Lambda Zero | nm | 1292 | 1294 | 1292 |
| MFD @ 1310 nm | µm | 8.50 | 8.45 | 8.17 |
| Aeff @ 1310 nm | µm² | 56.7 | 56.2 | 52.7 |
| LP01 Dispersion @ 850 nm | ps/nm-km | −87.6 | −87.5 | −88.1 |
| LP11 Dispersion @ 850 nm | ps/nm-km | −89 | −89 | −89 |
| |LP11 Disp./LP01 Disp.| @ 850 | — | 1.02 | 1.02 | 1.01 |
| LP01 Attenuation @ 980 nm | dB/km | 1.05 | 1.05 | 1.05 |
| LP11 Attenuation @ 980 nm | dB/km | 1.1 | 1.1 | 1.1 |
| LP01 MFD @ 980 nm | µm | 7.33 | 7.28 | 7.07 |

TABLE 6-continued

|  |  | Example | | |
|---|---|---|---|---|
|  |  | 9 | 10 | 11 |
| LP11 MFD @ 980 nm | μm | 7.13 | 7.10 | 6.85 |
| LP01 MFD @ 850 nm | μm | 6.87 | 6.82 | 6.62 |
| LP11 MFD @ 850 nm | μm | 6.54 | 6.82 | 6.31 |
| LP01 Dispersion @ 980 nm | ps/nm-km | −46.5 | −46.5 | −46.8 |
| LP11 Dispersion @ 980 nm | ps/nm-km | −49.8 | −50.2 | −49.7 |
| |LP11 Disp./LP01 Disp.| @ 980 | — | 1.07 | 1.08 | 1.06 |
| Bandwidth (fiber) @ 775 nm | GHz-km | 2.0 | 20.2 | 1.3 |
| Bandwidth (fiber) @ 800 nm | GHz-km | 23.1 | 39.4 | 1.1 |
| Bandwidth (fiber) @ 825 nm | GHz-km | 46.9 | 141.8 | 31.9 |
| Bandwidth (fiber) @ 850 nm | GHz-km | 200.6 | 204.8 | 122.1 |
| Bandwidth (fiber) @ 875 nm | GHz-km | 196.6 | 102.8 | 108.9 |
| Bandwidth (fiber) @ 900 nm | GHz-km | 122.8 | 150.2 | 49.7 |
| Bandwidth (fiber) @ 925 nm | GHz-km | 299.1 | 191.1 | 41.8 |
| Bandwidth (fiber) @ 950 nm | GHz-km | 97.1 | 37.0 | 50.5 |
| Bandwidth (fiber) @ 975 nm | GHz-km | 29.5 | 16.7 | 144.5 |
| Bandwidth (fiber) @ 1000 nm | GHz-km | 14.5 | 9.5 | 63.4 |
| Bandwidth (fiber) @ 1025 nm | GHz-km | 8.6 | 6.1 | 20.3 |
| Bandwidth (fiber) @ 1050 nm | GHz-km | 5.5 | 4.1 | 10.5 |
| Bandwidth (fiber) @ 1075 nm | GHz-km | 3.8 | 3.0 | 6.5 |

The optical waveguide fiber in the third set of embodiments, such as Examples 9-11, comprises a central segment 20 and an annular segment 30. The central segment comprises an alpha portion with an $\alpha_1$ between 2 and 4, preferably between 2.5 and 3.5. In some preferred embodiments, such as Examples 9 and 10, $\Delta_1(r)$ for the central segment comprises a centermost portion with a substantially constant relative refractive index, $\Delta_F$, and the alpha portion surrounds and is directly adjacent the centermost portion, and the alpha portion has an α-profile, preferably with an $\alpha_1$ between 2.5 and 3.5. In other embodiments, the central segment consists of an alpha portion and optionally may have a slight centerline dip.

For the third set of preferred embodiments, $\Delta_0$ is between 0.35 and 0.45%. $\Delta_F$ is between 0.35 and 0.40%. $R_F$ is between 0.5 and 2.0 μm. $\Delta_{1MAX}$ is between 0.35 and 0.45%, preferably between 0.37 and 0.43%; $R_1$ is between 5.0 and 5.5 μm, preferably between 5.1 and 5.4 μm; $\alpha_1$ is between 2 and 4, preferably between 2.5 and 3.5, more preferably 2.7 and 3.3; $\Delta_{2\ MIN}$ is between −0.10 and −0.15%, preferably between −0.12 and −0.15%; $R_2$ is between 10 and 13 μm, preferably between 11 and 12.5 μm; $W_2$ is between 5 and 8 μm, preferably 6 and 7.5 μm; and $R_{2MID}$ is between 7 and 10 μm, preferably 8 and 9 μm. $R_{2HI}$ is between 5.0 and 6.0 μm, $R_{2HO}$ is between 11 and 12.5 μm, HHPW$_2$ is between 5 and 7 μm, preferably 5.5 and 7 μm, and $R_{2HMID}$ is between 7 and 10 μm, preferably between 8 and 9 μm.

The third set of preferred embodiments have: dispersion at 1550 nm between 16 and 20 ps/nm-km, preferably 16 to 19 ps/nm-km; dispersion slope at 1550 nm less than 0.06 ps/nm²-km; attenuation at 1550 nm less than 0.20 dB/km; attenuation at 1310 nm less than 0.4 dB/km, preferably less than 0.35 dB/km; LP11 attenuation at 850 nm less than 2.0 dB/km; LP02 attenuation at 850 nm less than 2.0 dB/km; effective area at 1550 nm greater than 60 μm², preferably greater than 65 μm², and in some embodiments between 60 and 70 μm²; MFD at 1550 nm greater than 9.0 μm; pin array at 1550 nm less than 10 dB; lateral load at 1550 nm less than 1 dB/m, preferably less than 0.5 dB/m; LP11 cutoff (theoretical) less than 1300 nm; LP11 cutoff (fiber) less than 1250 nm; LP02 cutoff (theoretical) less than 875 nm, preferably less than 850 nm, more preferably less than 825 nm; LP02 cutoff (fiber) less than 850 nm, preferably less than 825 nm, more preferably less than 800 nm; LP11 pin array at 850 nm less than 1 dB, preferably less than 0.5 dB; the absolute magnitude of the dispersion of 1310 nm less than 5 ps/nm-km, preferably less than 2 ps/nm-km; dispersion slope at 1310 nm less 0.1 ps/nm²-km, preferably less than 0.09 ps/nm²-km; lambda zero less than 1320 nm, preferably between 1280 and 1320 nm; MFD at 1310 nm less than 9.5 μm, preferably between 8 and 9 μm; effective area at 1310 nm less than 65 μm². Preferably the LP01 dispersion at 850 nm has an absolute magnitude of less than 100 ps/nm-km, and the LP11 dispersion at 850 nm has an absolute magnitude of less than 100 ps/nm-km. Preferably, LP01 Attenuation at 980 nm<2 dB/km, more preferably <1.5 dB/km. Preferably, LP11 Attenuation at 980 nm<2 dB/km, more preferably <1.5 dB/km. Preferably, LP01 MFD at 980 nm>6.8 μm, more preferably >7.0 μm. Preferably, LP 11 MFD at 980 nm>6.5 μm, more preferably >6.8 μm. Preferably, LP01 MFD at 850 nm>6.0 μm, more preferably >6.5 μm. Preferably, LP11 MFD at 850 nm>6.0 μm, more preferably >6.3 μm. Preferably, the absolute magnitude of LP01 Dispersion at 980 nm<70 ps/nm-km, more preferably <50 ps/nm-km. Preferably, the absolute magnitude of LP11 Dispersion at 980 nm<70 ps/nm-km, more preferably <60 ps/nm-km. The absolute magnitude of dispersion of the LP11 mode at 850 nm is within 20%, preferably within 10%, even more preferably within 5%, of the absolute magnitude of the dispersion of the LP01 mode at 850 nm. The absolute magnitude of dispersion of the LP11 mode at 980 nm is within 20%, preferably within 10%, of the absolute magnitude of the dispersion of the LP01 mode at 980 nm.

Referring to FIG. 14 and Table 6, the fiber bandwidth of optical waveguide fiber in the third set of embodiments, such as Examples 9-11, is greater than 200 GHz-km at all wavelengths in a wavelength range having a rangewidth of at least 25 nm, wherein the wavelength range lies between 775 and 975 nm, and greater than 100 GHz-km at all wavelengths in a wavelength range having a rangewidth of at least 50 nm, wherein the wavelength range lies between 775 and 975 nm, and greater than 90 GHz-km at all wavelengths in a wavelength range having a rangewidth of at least 100 nm, wherein the wavelength range lies between 775 and 975 nm, and greater than 50 GHz-km at all wavelengths in a wavelength range having a rangewidth of at least 125 nm, wherein the wavelength range lies between 775 and 975 nm, and greater than 10 GHz-km at all wavelengths in a wavelength range having a rangewidth of at least 200 nm, wherein the wavelength range lies between 775 and 975 nm. As seen in FIG. 14, the bandwidth of optical fiber embodiments such as Example 11 is greater than 100 GHz-km over a rangewidth of 25 nm centered at about 980 nm. The bandwidth of optical fiber embodiments such as Example 11 is also greater than 50 GHz-km over a rangewidth of 50 nm centered at about 980 nm.

Preferably, the optical fiber disclosed herein is capable of transmitting optical signals in the 775 nm to 1650 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 15:
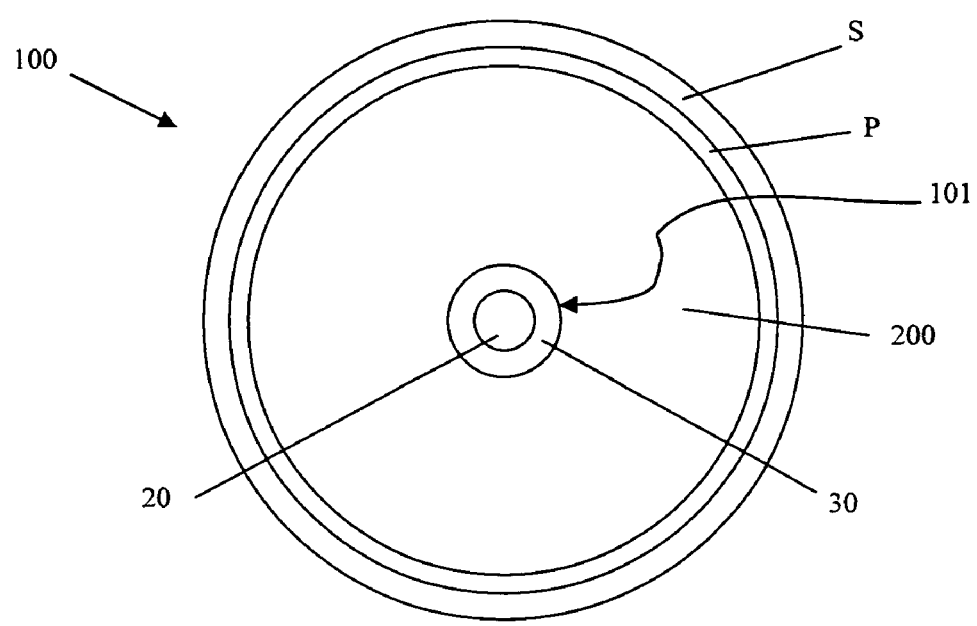
FIG. 15 is a schematic representation of an optical waveguide fiber as disclosed herein having a core and a clad layer directly adjacent and surrounding the core, wherein the core comprises two core segments.

FIG. 15 is a schematic representation (not to scale) of an optical waveguide fiber 100 as disclosed herein having core 101 and an outer annular cladding or outer cladding layer or clad layer 200 directly adjacent and surrounding the core 101. The core 101 has two segments as shown in FIG. 15. The clad layer 200 is surrounded by a primary coating P and a secondary coating S.

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The refractive index of the cladding 200 is used to calculate the relative refractive index percentage as discussed elsewhere herein.

Referring to the Figures, the clad layer 200 has a refractive index of $n_c$ surrounding the core having a $\Delta(r)=0\%$.

Preferably, the optical fiber disclosed herein has a silica-based core and cladding. In preferred embodiments, the cladding has an outer diameter, 2*Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

Figure 16:
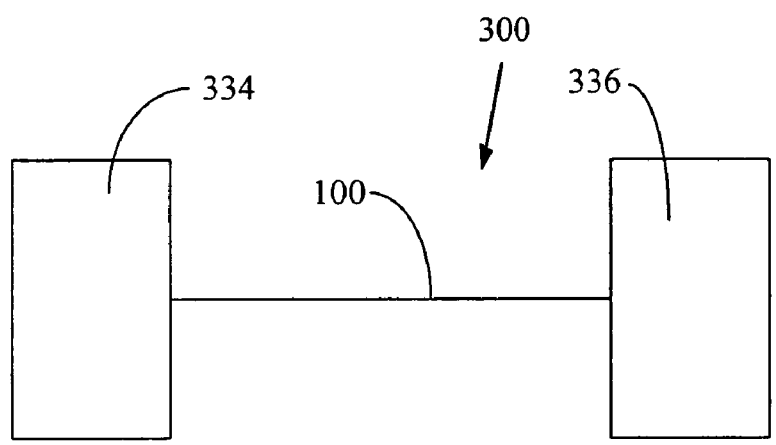
FIG. 16 is a schematic illustration of a fiber optic communication system employing an optical fiber as disclosed herein.

As shown in FIG. 16, an optical fiber 100 as disclosed herein may be implemented in an optical fiber communication system 300. System 300 includes a transmitter 334 and a receiver 336, wherein optical fiber 100 allows transmission of an optical signal between transmitter 334 and receiver 336. System 300 is preferably capable of 2-way communication, and transmitter 334 and receiver 336 are shown for illustration only. The system 300 preferably includes a link which has a section or a span of optical fiber as disclosed herein. The system 300 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Figure 17:
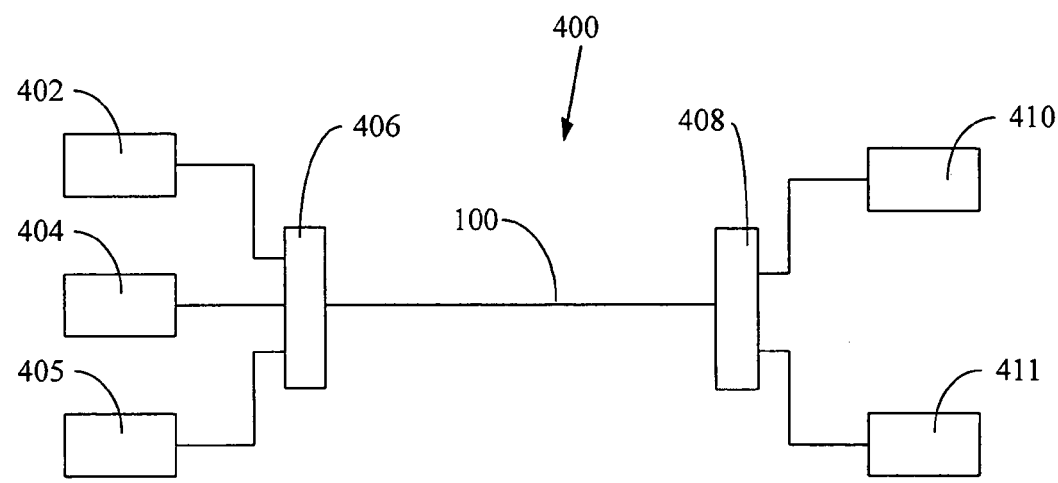
FIG. 17 is a schematic illustration of another optical communication system disclosed herein.

FIG. 17 schematically illustrates another system 400 disclosed herein comprising a first transmitter 402, second transmitter 404, receiver 405, multiplexer 406, multiplexer 408, transmitter 410, receiver 411, and optical fiber 100 as disclosed herein.

The first transmitter 402, second transmitter 404, and receiver 405 are optically connected to the multiplexer 406, for example by optical fiber, and transmitter 410 and receiver 411 are optically connected to multiplexer 408. Multiplexer 406 and multiplexer 408 are optically connected via optical fiber 100 as disclosed herein.

In preferred embodiments the first transmitter 402 is capable of transmitting a first optical signal in a first wavelength range, the second transmitter 404 is capable of transmitting a second optical signal in a second wavelength range outside the first wavelength range, and transmitter 410 is capable of transmitting a third optical signal in a third wavelength range outside of the first and second wavelength ranges. The optical fiber 100 is capable of simultaneously carrying the first and second signals from multiplexer 406 to multiplexer 408 and the third signal from multiplexer 408 to multiplexer 406. The propagation of the first and second signals may be referred to as downstream transmission, and the propagation of the third signal may be referred to as downstream transmission. Receiver 405 is adapted to receive either the first or second signal, and receiver 412 is adapted to receive the third optical signal. Preferably the first and second signals are single-moded. Preferably the third signal is single-moded or dual-moded. In one preferred embodiment, the first signal is within the 1310 nm band, the second signal is in the C-band, and the third signal is in the 850 nm band or the 980 nm band.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. No. 6,477,305, U.S. Patent Application Publication No. 2002102083, and PCT Application Publication No. WO01/47822.

A soot preform or soot body is preferably formed by directing silica soot toward a substrate to form a porous silica body. A substrate or bait rod or mandrel is inserted through a glass body such as a hollow or tubular handle and mounted on a lathe which rotates and translates the mandrel in close proximity with a soot-generating burner wherein at least a portion of silica-based reaction product is deposited on the mandrel and on a portion of the handle to form a body thereon. The mandrel is then removed from the soot body, and the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing soot the body to a chlorine-containing atmosphere at elevated temperature within the consolidation furnace. A chlorine-containing atmosphere removes water and other impurities from soot body, including near the centerline region surrounding centerline hole.

The soot blank is then consolidated into a sintered glass preform at temperatures of at least 1500° C. The centerline hole is then closed during the consolidation step so that the centerline hole does not have an opportunity to be rewetted by a hydrogen compound prior to centerline hole closure. Preferably, the centerline region has a weighted average OH content of less than about 1 ppb.

Plugs are used to seal off the centerline hole. Preferably the plugs are glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 µm to about 2 mm. Even more preferably, at least a portion of a top plug has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. Consequently, overall lower O—H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths.

The fibers disclosed herein exhibit low PMD values particularly when fabricated with OVD processes. Spinning of the optical fiber may also lower PMD values for the fiber disclosed herein.

In one set of preferred embodiments, an optical waveguide fiber is disclosed herein comprising: a central segment extending radially outwardly from a centerline to a radius $R_1$ and having a positive relative refractive index percent profile, $\Delta_1(r)$ in %, wherein the central segment has a maximum relative refractive index percent, $\Delta_{1MAX}$; an annular segment surrounding and directly adjacent to the central core region and extending to a radius $R_2$ and having a negative relative refractive index percent profile, $\Delta_2(r)$ in %, with a minimum relative refractive index percent, $\Delta_{2MIN}$; and an outer annular cladding surrounding the annular region and having a relative refractive index percent, $\Delta_c(r)$ in %; wherein $\Delta_{1MAX} > 0 > \Delta_{2MIN}$; and, wherein the relative refractive index of the optical fiber is selected to provide a bandwidth greater than 2 GHz-km at all wavelengths in a wavelength range having a rangewidth of at least 25 nm, and wherein the wavelength range lies between 775 and 1100 nm.

In a preferred embodiment, the bandwidth is greater than 3 GHz-km at all wavelengths in the wavelength range. In another preferred embodiment, the bandwidth is greater than 5 GHz-km at all wavelengths in the wavelength range. In yet another preferred embodiment, the bandwidth is greater than 10 GHz-km at all wavelengths in the wavelength range. In still another preferred embodiment, the bandwidth is greater than 20 GHz-km at all wavelengths in the wavelength range. In another preferred embodiment, the bandwidth is greater than 50 GHz-km at all wavelengths in the wavelength range. In still another preferred embodiment, the bandwidth is greater than 100 GHz-km at all wavelengths in the wavelength range. In yet another preferred embodiment, the bandwidth is greater than 150 GHz-km at all wavelengths in the wavelength range.

In a preferred embodiment, the rangewidth is greater than 50 nm. In another preferred embodiment, the rangewidth is greater than 100 nm. In yet another preferred embodiment, the rangewidth is greater than 150 nm.

In a preferred embodiment, the rangewidth is greater than 50 nm, and the bandwidth is greater than 10 GHz-km at all wavelengths in the wavelength range. In another preferred embodiment, the rangewidth is greater than 50 nm, and the bandwidth is greater than 20 GHz-km at all wavelengths in the wavelength range. In yet another preferred embodiment, the rangewidth is greater than 50 nm, and the bandwidth is greater than 50 GHz-km at all wavelengths in the wavelength range.

In a preferred embodiment, the bandwidth is greater than 2 GHz-km at all wavelengths between 825 and 875 nm. In another preferred embodiment, the bandwidth is greater than 3 GHz-km at all wavelengths between 825 and 875 mm. In yet another preferred embodiment, the bandwidth is greater than 10 GHz-km at all wavelengths between 825 and 875 nm. In still another preferred embodiment, the bandwidth is greater than 20 GHz-km at all wavelengths between 825 and 875 nm. In still another preferred embodiment, the bandwidth is greater than 50 GHz-km at all wavelengths between 825 and 875 nm. In yet another preferred embodiment, the bandwidth is greater than 100 GHz-km at all wavelengths between 825 and 875 nm. In other preferred embodiments, the bandwidth is greater than 50 GHz-km at all wavelengths between 950 and 1000 nm.

Preferably, the optical fiber has an LP11 fiber cutoff less than 1260 nm. Preferably, the optical fiber has an LP02 fiber cutoff less than 850 nm. Preferably, the optical fiber has an LP02 fiber cutoff less than 800 nm.

In some preferred embodiments, the bandwidth is greater than 5 GHz-km at all wavelengths between 775 and 975 nm. In other preferred embodiments, the bandwidth is greater than 10 GHz-km at all wavelengths between 775 and 975 nm. In still other preferred embodiments, the bandwidth is greater than 20 GHz-km at all wavelengths between 775 and 975 nm. In yet other preferred embodiments, the bandwidth is greater than 50 GHz-km at all wavelengths between 775 and 975 nm. In other preferred embodiments, the bandwidth is greater than 100 GHz-km at all wavelengths between 775 and 975 nm. In still other preferred embodiments, the bandwidth is greater than 200 GHz-km at all wavelengths between 775 and 975 nm. In some preferred embodiments, the bandwidth is greater than 250 GHz-km at all wavelengths between 775 and 975 nm. In other preferred embodiments, the bandwidth is greater than 200 GHz-km at all wavelengths in the wavelength range.

In a preferred embodiment, the bandwidth is greater than 10 GHz-km for all wavelengths in a wavelength range, and the rangewidth is greater than 100 nm. In another preferred embodiment, the bandwidth is greater than 20 GHz-km for all wavelengths in a wavelength range, and the rangewidth is greater than 100 nm. In still another preferred embodiment, the bandwidth is greater than 50 GHz-km for all wavelengths in a wavelength range, and wherein the rangewidth is greater than 100 nm. In yet another preferred embodiment, the bandwidth is greater than 90 GHz-km for all wavelengths in a wavelength range, and the rangewidth is greater than 100 nm. In another preferred embodiment, the bandwidth is greater than 100 GHz-km for all wavelengths in a wavelength range, and wherein the rangewidth is greater than 50 nm. In yet another preferred embodiment, the bandwidth is greater than 200 GHz-km for all wavelengths in a wavelength range, and wherein the rangewidth is greater than 25 nm.

In some preferred embodiments, the bandwidth is greater than 2 GHz-km for all wavelengths between 800 and 950 nm. In other preferred embodiments, the bandwidth is greater than 3 GHz-km for all wavelengths between 825 and 925 nm. In still other preferred embodiments, the bandwidth is greater than 5 GHz-km for all wavelengths between 825 and 925 nm.

In some embodiments, the optical fiber preferably has: a zero-dispersion wavelength of less than 1320 nm, more preferably between 1280 and 1320 nm; a mode field diameter at 1310 nm less than 9.5 µm, more preferably between 8.5 and 9.5 µm; an effective area of greater than about 60 µm² at 1550 nm; a dispersion of between 16 and 20 ps/nm-km at 1550 nm; a dispersion slope less than 0.07 ps/nm²/km at 1550 nm; and an attenuation less than 0.20 dB/km at 1550 nm. The pin array loss of the optical fiber is preferably less than 10 dB. The lateral load loss of the optical fiber is preferably less than 0.5 dB/m.

Preferably, $\Delta_{1MAX}$ is between 0.35 and 0.45%, and $\Delta_{2MIN}$ is between −0.05 and −0.15%. Preferably, the relative refractive index for all radii greater than $R_2$ is substantially constant, for example, the relative refractive index for all radii greater than $R_2$ has an absolute magnitude less than 0.05%.

Preferably, the central segment comprises a centermost portion and an alpha portion surrounding and directly adjacent the centermost portion, wherein the alpha portion has an alpha between 1.8 and 4.0. In some preferred embodiments, the alpha is between 2.0 and 3.5.

Preferably, the central segment has an outermost radius, $R_1$, between 5.0 and 5.5 µm. Preferably, the annular segment has an outermost radius $R_2$ between 8 and 13 µm. Preferably, the annular segment has a width $W_2$ between 3 and 8 µm, and a midpoint $R_{2MID}$ between 7 and 10 µm.

Preferably, the optical fiber has a MFD greater than about 9.0 µm at a wavelength of about 1550 nm.

Preferably, the optical fiber has a dispersion of between −5 and 5 ps/nm-km at a wavelength of about 1310 nm, and a dispersion slope of less than 0.10 ps/nm²-km at a wavelength of about 1310 nm.

Preferably, the optical fiber has an effective area of greater than 60 µm² at a wavelength of about 1550 nm.

Preferably, the optical fiber has an effective area of greater than 50 µm² at a wavelength of about 1310 mm.

Preferably, the optical fiber has an attenuation of less than 0.4 dB/km at a wavelength of about 1310 nm.

Preferably, the optical fiber has a cabled cutoff wavelength of less than 1300 nm.

Preferably, the pin array loss of the optical fiber is less than 20 dB at 1550 nm.

Preferably, the optical fiber has an attenuation at 1380 nm not more than 0.1 dB/km greater than an attenuation at 1310 nm.

An optical fiber communication system is disclosed herein comprising a transmitter, a receiver, and an optical fiber transmission line comprising the optical fiber disclosed herein and a second optical fiber having a negative dispersion at a wavelength of about 1550 nm.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of the optical fiber disclosed herein.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 850 nm band, the 980 nm band, the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 850 nm band, the 980 nm band, the 1310 nm band, the E-band, the S-band, the C-band, and the L-band. In one preferred embodiment, the system operates at one or more wavelengths between 1530 and 1565 nm.

In one preferred embodiment, the system operates at ≧ about 1 Mb/s. In another preferred embodiment, the system operates at ≧ about 640 Mb/s. In yet another preferred embodiment, the system operates at ≧ about 2.5 Gbit/s. In still another preferred embodiment, the system operates at ≧ about 10 Gbit/s. In yet another preferred embodiment, the system operates at greater than or equal to about 40 Gbit/s.

An optical communication system is disclosed herein comprising: a transmitter for transmitting signals at one or more wavelengths between 775 and 1100 nm; a receiver for receiving the signals; and a broadband optical fiber optically connecting the transmitter and receiver, wherein the optical fiber is capable of carrying optical signals from the transmitter to the receiver at a bandwidth greater than 2 GHz-km at all wavelengths in a wavelength range having a rangewidth of at least 25 nm, wherein the wavelength range lies between 775 and 1100 nm.

An optical communication system is disclosed herein comprising: a first transmitter for transmitting a first signal at a first wavelength within 775 and 1100 nm; a second transmitter for transmitting a second optical signal at a second wavelength outside 775 and 1100 nm; a first receiver for receiving the first signal; a second receiver for receiving the second signal; and a broadband optical fiber optically connecting the first transmitter to the first receiver and optically connecting the second transmitter to the second receiver, wherein the first signal enters one end of the optical fiber and the second signal enters an opposite end of the optical fiber, wherein the optical fiber is capable of carrying the first optical signal from the first transmitter to the first receiver at a bandwidth greater than 2 GHz-km at all wavelengths in a wavelength range having a rangewidth of at least 25 nm, wherein the wavelength range lies between 775 and 1100 nm. The optical fiber carries the first signal from the transmitter to the receiver.

Another optical communication system is disclosed herein comprising: an optical source for generating optical signals between 775 and 1100 nm; an optical modulator optically connected to the optical source, wherein the optical modulator imparts an optical distortion to the signals for compensating dispersion of the signals; an optical fiber, as disclosed herein, wherein all optical modes transmitted between 775 and 1100 nm through the fiber have an absolute magnitude of dispersion within 20%, preferably within 10%, of the absolute magnitude of the dispersion of the LP01 mode transmitted through the fiber; and a feedback loop which detects the optical signals transmitted through the fiber and provides a driving signal to the optical modulator. The system further preferably comprises a receiver optically connected to the optical fiber for receiving the optical signals. In preferred embodiments, the feedback loop is an electronic feedback loop. The electronic feedback loop comprises a detector which senses the optical signals and converts the optical signals into one or more electrical feedback signals. The electronic feedback loop further preferably comprises a filter for optimizing the electrical feedback signals. The electrical feedback signals are carried to a compensation modulator. The compensation modulator accepts an electrical input driving signal which is modulated by the electrical feedback signals to produce a modulated electrical driving signal encoded according to an electronic dispersion compensation algorithm. The modulated electrical driving signal is fed into the optical modulator for driving the modulator to distort the optical signals coming from the optical source. The optical fiber is dual-moded in the operating wavelength band. In preferred embodiments, the operating wavelength band lies between 775 nm and 1100 nm. In one preferred embodiment, the optical source transmits optical signals in the 850 nm band. In another preferred embodiment, the optical source transmits optical signals in the 980 nm band.

Figure 18:
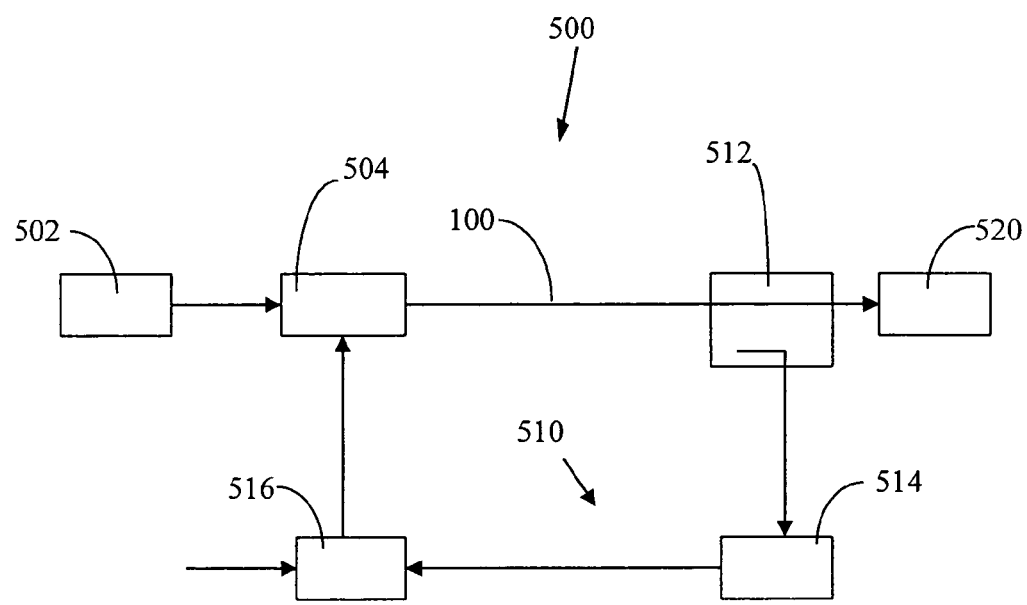
FIG. 18 is a schematic illustration of yet another optical communication system disclosed herein.

Referring to FIG. 18, another optical communication system is disclosed herein comprising: an optical source 502 for generating optical signals between 775 and 1100 nm; an optical modulator 504 optically connected to the optical source, wherein the optical modulator imparts an optical distortion to the signals for compensating dispersion of the signals; an optical fiber 100, as disclosed herein, wherein all optical modes transmitted between 775 and 1100 nm through the fiber have an absolute magnitude of dispersion within 20%, preferably within 10%, of the absolute magnitude of the dispersion of the LP01 mode transmitted through the fiber; and a feedback loop 510 which detects the optical signals transmitted through the fiber 100 and provides a driving signal to the optical modulator 504. The system further preferably comprises a receiver 520 optically connected to the optical fiber 100 for receiving the optical signals. In preferred embodiments, the feedback loop 510 is an electronic feedback loop. The electronic feedback loop comprises a detector 512 which senses the optical signals and converts the optical signals into one or more electrical feedback signals. The electronic feedback loop 510 further preferably comprises a filter for optimizing the electrical feedback signals. The electrical feedback signals are carried to a compensation modulator 516. The compensation modulator 516 accepts an electrical input driving signal which is modulated by the electrical feedback signals to produce a modulated electrical driving signal encoded according to an electronic dispersion compensation algorithm. The modulated electrical driving signal is fed into the optical modulator 516 for driving the modulator to distort the optical signals coming from the optical source 502. In preferred embodiments, the optical fiber 100 is dual-moded in the operating wavelength band. Both modes (LP01 and LP11) in the fiber have similar dispersions, such that the dispersions of both modes can be compensated by the same feedback loop. In preferred embodiments, the operating wavelength band lies between 775 nm and 1100 nm. In one preferred embodiment, the optical source 502 transmits optical signals in the 850 nm band. In another preferred embodiment, the optical source 502 transmits optical signals in the 980 nm band. Electrical dispersion compensation is discussed in U.S. Publication No. 2004/0067064.

A method of electronically compensating dispersion in an optical communication system comprises: generating optical signals between 775 and 1100 nm; imparting an optical distortion to the optical signals for compensating dispersion of the signals; transmitting the optical signals through an optical fiber, as disclosed herein, wherein all optical modes transmitted between 775 and 1100 nm through the fiber have an absolute magnitude of dispersion within 20%, preferably within 10%, of the absolute magnitude of the dispersion of the LP01 mode transmitted through the fiber; detecting the optical signals transmitted through the fiber and generating a feedback signal; and modifying the optical distortion imparted to the optical signals based upon the feedback signal. The method further comprises detecting the optical signals and converting the optical signals into one or more electrical feedback signals; providing an electrical input driving signal; modulating the electrical input driving signal by the electrical feedback signals to produce a modulated electrical driving signal encoded according to an electronic dispersion compensation algorithm; and modifying the optical distortion imparted to the generated optical signals based upon the feedback signal. In preferred embodiments, the optical fiber is dual-moded in the operating wavelength band. In preferred embodiments, the operating wavelength band lies between 775 nm and 1100 nm. In one preferred embodiment, the optical signals are in the 850 nm band. In another preferred embodiment, the optical signals are in the 980 nm band.

A method of transmitting optical signals through an optical fiber is disclosed herein, the method comprising: transmitting the optical signals through the optical fiber at a bandwidth greater than 2 GHz-km at all wavelengths in a wavelength range having a rangewidth of at least 25 nm, wherein the wavelength range lies between 775 and 1100 nm.

A method of transmitting optical signals through a broadband optical fiber is disclosed herein, the method comprising: transmitting a first optical signal at a bandwidth greater than 2 GHz-km at all wavelengths in a first wavelength range having a rangewidth of at least 25 nm, wherein the first wavelength range lies between 775 and 1100 nm. In one preferred embodiment, the method further comprises transmitting a second optical signal of the optical signals at a wavelength in a second wavelength range outside the first wavelength range. In some embodiments, the first optical signal is transmitted in a first longitudinal direction within the optical fiber, and the second optical signal is transmitted in a second longitudinal direction opposite to the first longitudinal direction, wherein in one or more embodiments the second optical signal is transmitted at a wavelength in the 1310 nm band. In some preferred embodiments, the second optical signal is single-moded. In preferred embodiments, the second wavelength range is between 1260 and 1360 nm (in the 1310 nm band). The method may further comprise transmitting a third optical signal at a wavelength in a third wavelength range outside the first and second wavelength ranges. In preferred embodiments, the third wavelength range is between 1530 and 1565 nm (in the C band). The method may further comprise transmitting a fourth optical signal at a wavelength in a third wavelength range outside the first, second, and third wavelength ranges. In a preferred embodiment, the fourth wavelength range is between 1460 and 1530 nm (in the S band).

A method of transmitting optical signals through a broadband optical fiber is disclosed herein, the method comprising: transmitting a first optical signal in a downstream direction in the fiber; and transmitting a second optical signal in an upstream direction in the fiber; wherein the first optical signal is transmitted at a wavelength in a first wavelength range having a bandwidth greater than 2 GHz-km at all wavelengths within the first wavelength range, wherein the first wavelength range has a rangewidth of at least 25 nm.

A method of transmitting optical signals in an optical network comprising first and second nodes optically connected by a broadband optical fiber is disclosed herein, the method comprising: transmitting at least one downstream optical signal from the first node to the second node; and transmitting at least one upstream optical signal from the second node to the first node; wherein the downstream optical signal is transmitted at a wavelength in the 850 nm band, the 980 nm band, the 1490 nm band, or the 1550 nm band; and wherein the upstream optical signal is transmitted at a wavelength in the 1310 nm band.

An optical system is disclosed herein comprising an optical source with an operating wavelength of about 980 nm, an erbium-doped optical fiber, and the optical fiber disclosed herein optically coupling the optical source and the erbium-doped optical fiber. The optical fibers disclosed herein comprise larger mode field diameters (compared to conventional low-cutoff optical fibers that have been used to connect optical sources with erbium-doped optical fiber), and thus provide better coupling efficiency, lower nonlinearities, and better splicing (lower splice losses).

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising:
 a central core region extending radially outwardly from a centerline to a radius $R_1$ and having a positive relative refractive index percent profile, $\Delta_1(r)$ in %, wherein the central core region has a maximum relative refractive index percent, $\Delta_{1MAX}$;
 an annular region surrounding and directly adjacent to the central core region and extending to a radius $R_2$ and having a negative relative refractive index percent profile, $\Delta_2(r)$ in %, with a minimum relative refractive index percent, $\Delta_{2MIN}$; and
 an outer annular cladding surrounding the annular region and having a relative refractive index percent, $\Delta_c(r)$ in %;
 wherein $\Delta_{1MAX} > 0 > \Delta_{2MIN}$;
 wherein the relative refractive index of the optical fiber is selected to provide a bandwidth greater than 5 GHz-km at all wavelengths in a wavelength range having a rangewidth of at least 25 nm, and wherein the wavelength range lies between 775 and 1100 nm.

2. The optical fiber of claim 1 wherein the bandwidth is greater than 10 GHz-km at all wavelengths in a wavelength range having a rangewidth of at least 100 nm.

3. The optical fiber of claim 1 wherein the rangewidth is greater than 125 nm.

4. The optical fiber of claim 1 wherein the bandwidth is greater than 5 GHz-km at all wavelengths between 825 and 875 nm.

5. The optical fiber of claim 1 wherein the optical fiber has an LP11 fiber cutoff less than 1260 nm.

6. The optical fiber of claim 1 wherein the optical fiber has an LP02 fiber cutoff less than 850 nm.

7. The optical fiber of claim 1 wherein the bandwidth is greater than 2 GHz-km for all wavelengths between 800 and 950 nm.

8. The optical fiber of claim 1 wherein $\Delta_{1MAX}$ is between 0.35 and 0.45%.

9. The optical fiber of claim 1 wherein $\Delta_{2MIN}$ is between −0.05 and −0.15%.

10. The optical fiber of claim 1 wherein the relative refractive index for all radii greater than $R_2$ has an absolute magnitude less than 0.05%.

11. The optical fiber of claim 1 wherein the central core region comprises a centermost portion and an alpha portion surrounding and directly adjacent the centermost portion, wherein the alpha portion has an alpha between 1.8 and 4.0.

12. The optical fiber of claim 1 wherein the central core region has an outermost radius, $R_1$, between 5.0 and 5.5 μm.

13. The optical fiber of claim 1 wherein the annular region has an outermost radius $R_2$ between 8 and 13 μm.

14. The optical fiber of claim 1 wherein the annular region has a width $W_2$ between 3 and 8 μm, and a midpoint $R_{2MID}$ between 7 and 10 μm.

15. The optical fiber of claim 1 wherein the optical fiber has an effective area of greater than about 60 μm² at 1550 nm.

16. The optical fiber of claim 1 wherein the optical fiber has an attenuation less than 0.20 dB/km at 1550 nm.

17. The optical fiber of claim 1 wherein the pin array loss of the optical fiber is less than 10 dB.

18. The optical fiber of claim 1 wherein the lateral load loss of the optical fiber is less than 0.5 dB/m.

19. The optical fiber of claim 1 wherein the optical fiber has an attenuation of less than 0.4 dB/km at a wavelength of about 1310 nm.

20. The optical fiber of claim 1 wherein the optical fiber has an attenuation at 1380 nm not more than 0.1 dB/km greater than an attenuation at 1310 nm.

21. An optical communication system comprising the optical fiber of claim 1, wherein all optical modes transmitted between 775 and 1100 nm through the fiber have an absolute magnitude of dispersion within 20% of the absolute magnitude of the dispersion of the LP01 mode transmitted through the fiber, the system further comprising:
- an optical source for generating optical signals between 775 and 1100 nm;
- an optical modulator optically connected to the optical source, wherein the optical modulator imparts an optical distortion to the signals for compensating dispersion of the signals, wherein the optical fiber is optically connected to the optical modulator; and
- a feedback loop which detects the optical signals transmitted through the fiber and provides a driving signal to the optical modulator.

22. A method of electronically compensating dispersion in an optical fiber comprising the optical fiber of claim 1, wherein all optical modes transmitted between 775 and 1100 nm through the fiber have an absolute magnitude of dispersion within 20% of the absolute magnitude of the dispersion of the LP01 mode transmitted through the fiber, the method further comprising:
- generating optical signals between 775 and 1100 nm;
- imparting an optical distortion to the optical signals for compensating dispersion of the signals;
- transmitting the optical signals through the optical fiber;
- detecting the optical signals transmitted through the fiber and generating a feedback signal; and
- modifying the optical distortion imparted to the optical signals based upon the feedback signal.

23. The optical fiber of claim 1 wherein the optical fiber has an LP01 mode field diameter at 850 nm greater than 6.0 μm and an LP11 mode field diameter at 850 nm greater than 6.0 μm.

24. The optical fiber of claim 1 wherein the optical fiber has an LP01 mode field diameter at 850 nm greater than 6.5 μm and an LP11 mode field diameter at 850 nm greater than 6.0 μm.

* * * * *